US008032756B2

(12) United States Patent
Inami

(10) Patent No.: US 8,032,756 B2
(45) Date of Patent: Oct. 4, 2011

(54) INFORMATION PROCESSING SYSTEM

(75) Inventor: Hiroko Inami, Chiba (JP)

(73) Assignee: Hitachi, Ltd., Tokyo (JP)

( * ) Notice: Subject to any disclaimer, the term of this patent is extended or adjusted under 35 U.S.C. 154(b) by 1089 days.

(21) Appl. No.: 11/513,376

(22) Filed: Aug. 31, 2006

(65) Prior Publication Data

US 2007/0266234 A1 Nov. 15, 2007

(30) Foreign Application Priority Data

May 12, 2006 (JP) .................................. 2006-133439

(51) Int. Cl.
*H04L 9/32* (2006.01)
(52) U.S. Cl. ....................................................... 713/176
(58) Field of Classification Search ........................ None
See application file for complete search history.

(56) References Cited

U.S. PATENT DOCUMENTS

| | | | | |
|---|---|---|---|---|
| 5,615,268 | A * | 3/1997 | Bisbee et al. .................. | 713/176 |
| 6,925,182 | B1 * | 8/2005 | Epstein .......................... | 380/277 |
| 7,051,364 | B1 * | 5/2006 | Tackman et al. .................. | 726/3 |
| 7,237,114 | B1 * | 6/2007 | Rosenberg ..................... | 713/176 |
| 2001/0047406 | A1 * | 11/2001 | Araujo et al. ................. | 709/223 |
| 2002/0053021 | A1 * | 5/2002 | Rice et al. ..................... | 713/155 |
| 2004/0025030 | A1 * | 2/2004 | Corbett-Clark et al. ....... | 713/186 |
| 2004/0059924 | A1 * | 3/2004 | Soto et al. ...................... | 713/186 |
| 2004/0172310 | A1 * | 9/2004 | Atlee et al. ......................... | 705/4 |
| 2004/0236694 | A1 * | 11/2004 | Tattan et al. ..................... | 705/50 |
| 2005/0144481 | A1 * | 6/2005 | Hopen et al. ................... | 713/201 |
| 2005/0222924 | A1 * | 10/2005 | Sumino et al. .................. | 705/35 |
| 2006/0080547 | A1 * | 4/2006 | Higashiura et al. ........... | 713/186 |
| 2006/0259440 | A1 * | 11/2006 | Leake et al. ..................... | 705/76 |
| 2009/0031132 | A1 * | 1/2009 | Lehwany ...................... | 713/176 |

FOREIGN PATENT DOCUMENTS

JP 2003-337672 11/2003

* cited by examiner

*Primary Examiner* — David Pearson
(74) *Attorney, Agent, or Firm* — Brundidge & Stanger, P.C.

(57) ABSTRACT

A signature support system includes a local machine, a remote machine, a document management server, and a signature server. The remote machine uses terminal services of the local machine to access the document management server, and correlates document data with a document ID serving as identification information for the document data, to register the document data in the document management server. Similarly, the signature server is accessed, and caused to generate a pair of a signature key and a verification key, and the keys are correlated with biological information read by a biological information reader, and are registered in the signature server. The signature server generates signature data for the document data that is correlated with the document ID received from a user, and is registered in the document management server, by using the signature key correlated with the biological information read by the biological information reader, and registered in the signature server.

5 Claims, 18 Drawing Sheets

FIG. 1
ELECTRONIC CONTRACT SYSTEM
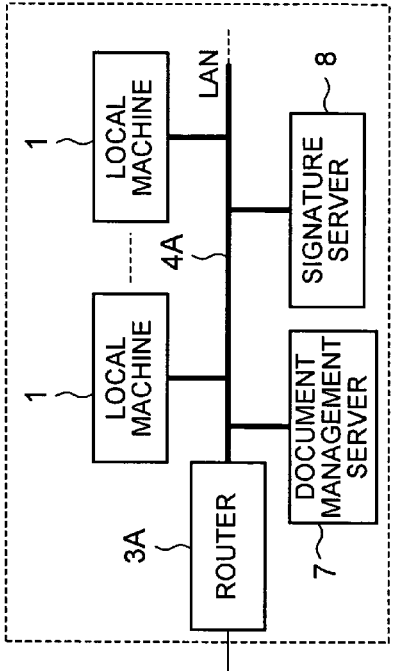
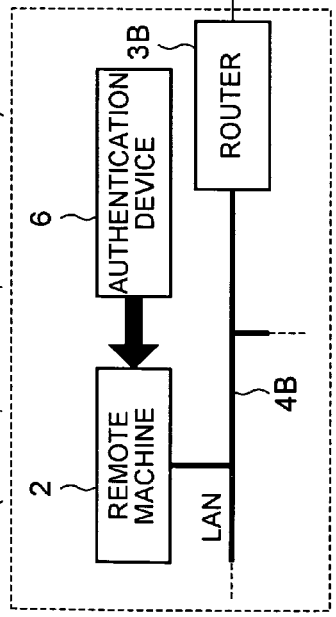
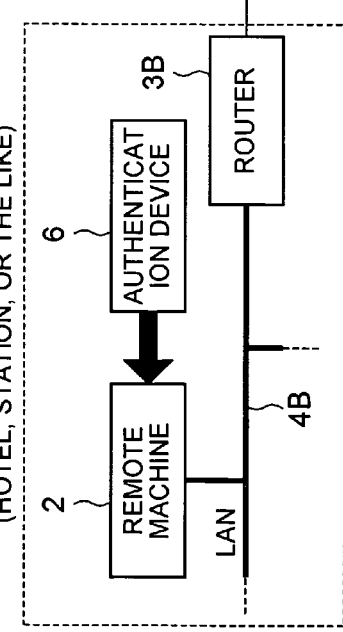

FIG. 3

AUTHENTICATION INFORMATION MANAGEMENT TL 1046

| | | |
|---|---|---|
| 1041 | LOCAL MACHINE AUTHENTICATION INFORMATION | USER ID:****** |
| | | PW:****** |
| 1042 | DOCUMENT MANAGEMENT SERVER AUTHENTICATION INFORMATION | USER ID:****** |
| | | PW:****** |
| 1043 | SIGNATURE SERVER AUTHENTICATION INFORMATION | USER ID:****** |
| | | PW:****** |

FIG. 12

TEMPLATE DB 7043

| CONTRACT TYPE | TEMPLATE DATA (BINARY DATA) |
|---|---|
| PERMANENT LIFE INSURANCE | *********** |
| LIMITED-PAYMENT LIFE INSURANCE | *********** |
| TERM LIFE INSURANCE | *********** |
| ACCIDENT PERMANENT INSURANCE | *********** |
| ⋮ | ⋮ |

CONTRACT DB 7044

| DOCUMENT ID | CONTRACT DATA (BINARY DATA) | USER ID | SIGNATURE ID |
|---|---|---|---|
| 00001 | ************ | ***** | ***** |
| 00002 | ************ | ***** | ***** |
| 00003 | ************ | ***** | ***** |
| 00004 | ************ | ***** | ***** |
| ⋮ | ⋮ | ⋮ | ⋮ |

KEY DB 8043

| ORGANISM INFORMATION (BINARY DATA) 80431 | SIGNATURE KEY ID 80432 | SIGNATURE KEY 80433 | VERIFICATION KEY ID 80434 | VERIFICATION KEY 80435 |
|---|---|---|---|---|
| ************ | ***** | ***** | ***** | ***** |
| ************ | ***** | ***** | ***** | ***** |
| ************ | ***** | ***** | ***** | ***** |
| ************ | ***** | ***** | ***** | ***** |
| ⋮ | ⋮ | ⋮ | ⋮ | ⋮ |

SIGNATURE DB 8044

| SIGNATURE ID 80441 | SIGNATURE INFORMATION (BINARY DATA) 80442 | SIGNATURE ID 80443 | VERIFICATION KEY ID 80444 |
|---|---|---|---|
| ***** | ************ | ***** | ***** |
| ***** | ************ | ***** | ***** |
| ***** | ************ | ***** | ***** |
| ***** | ************ | ***** | ***** |
| ⋮ | ⋮ | ⋮ | ⋮ |

80440

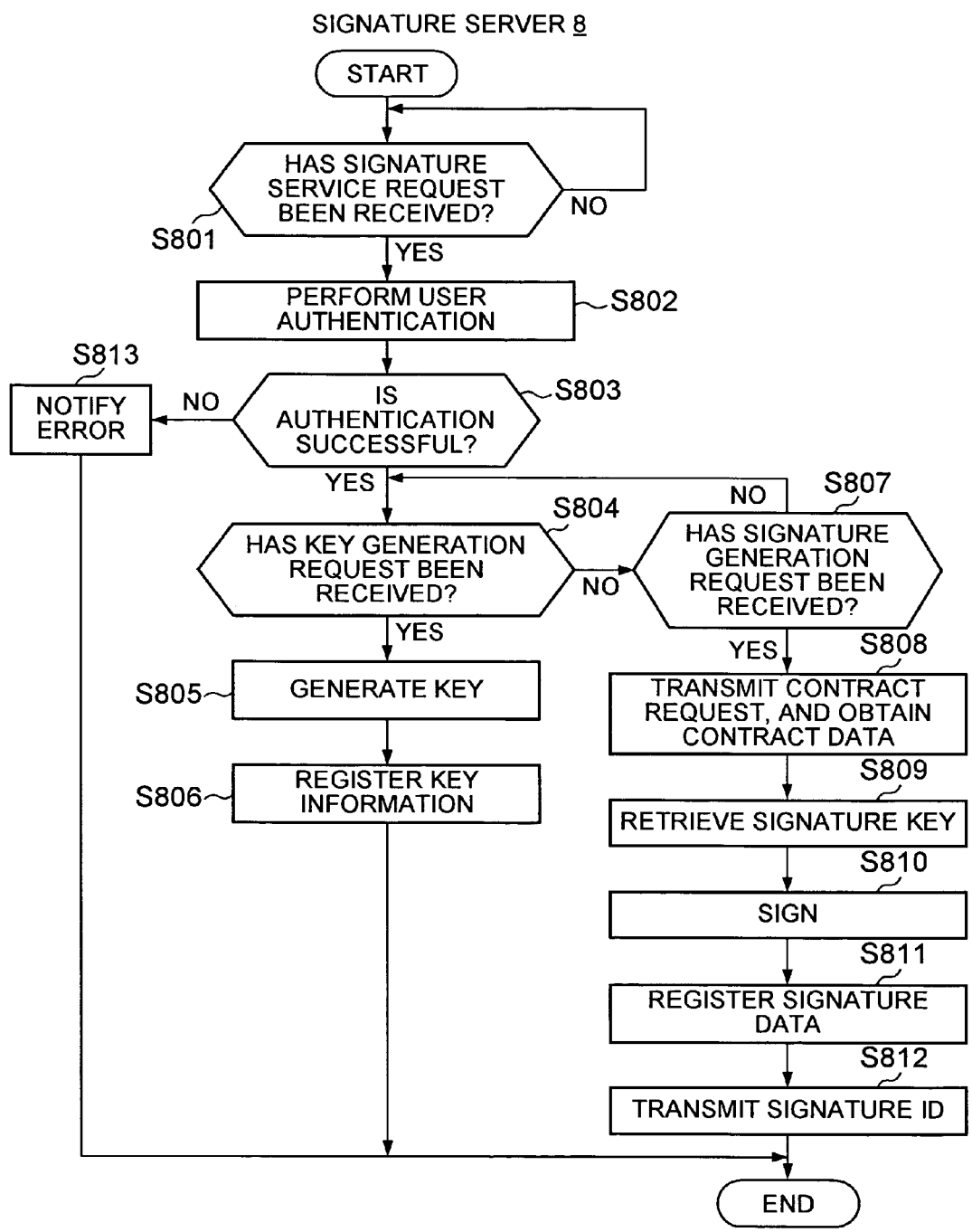

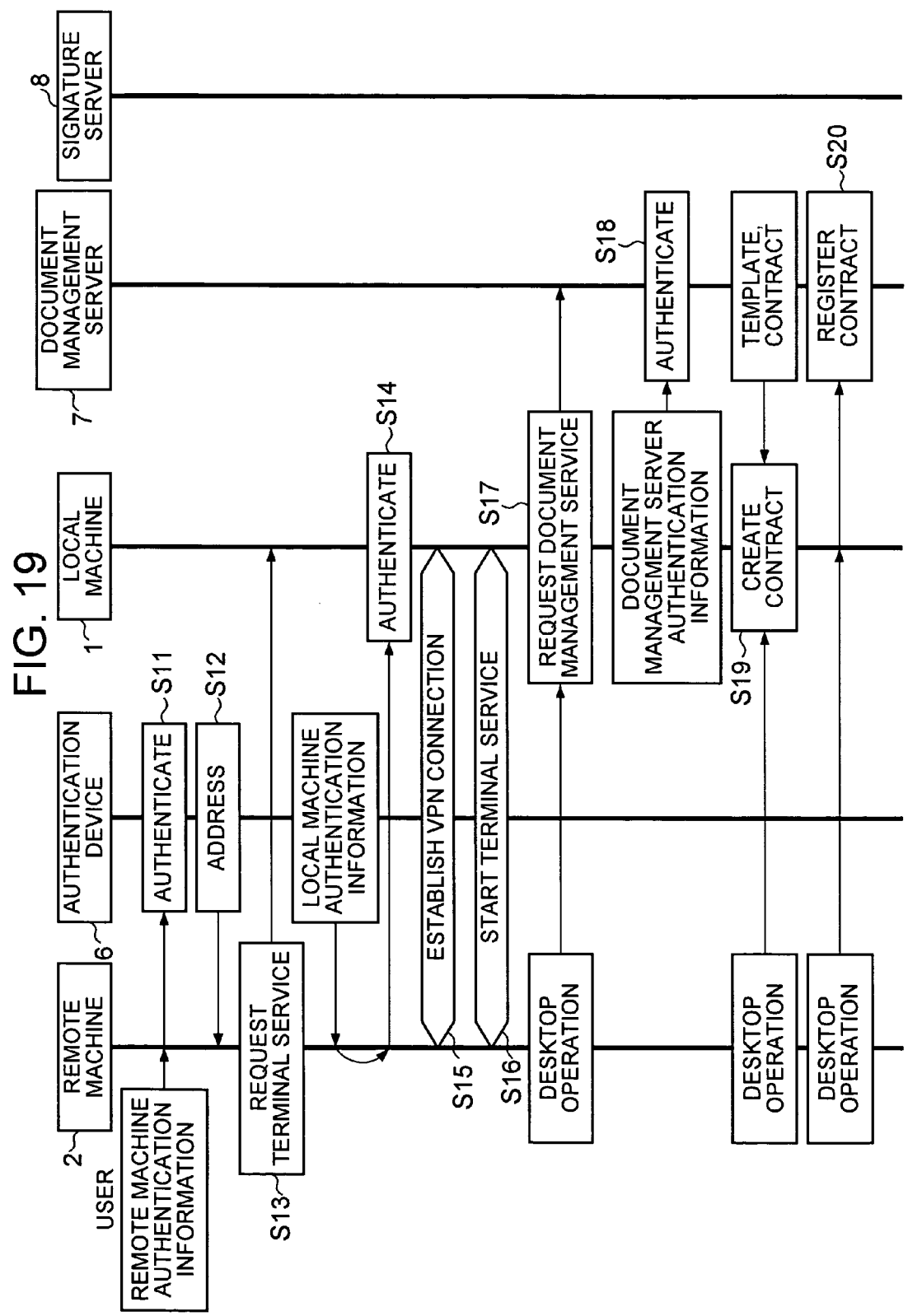

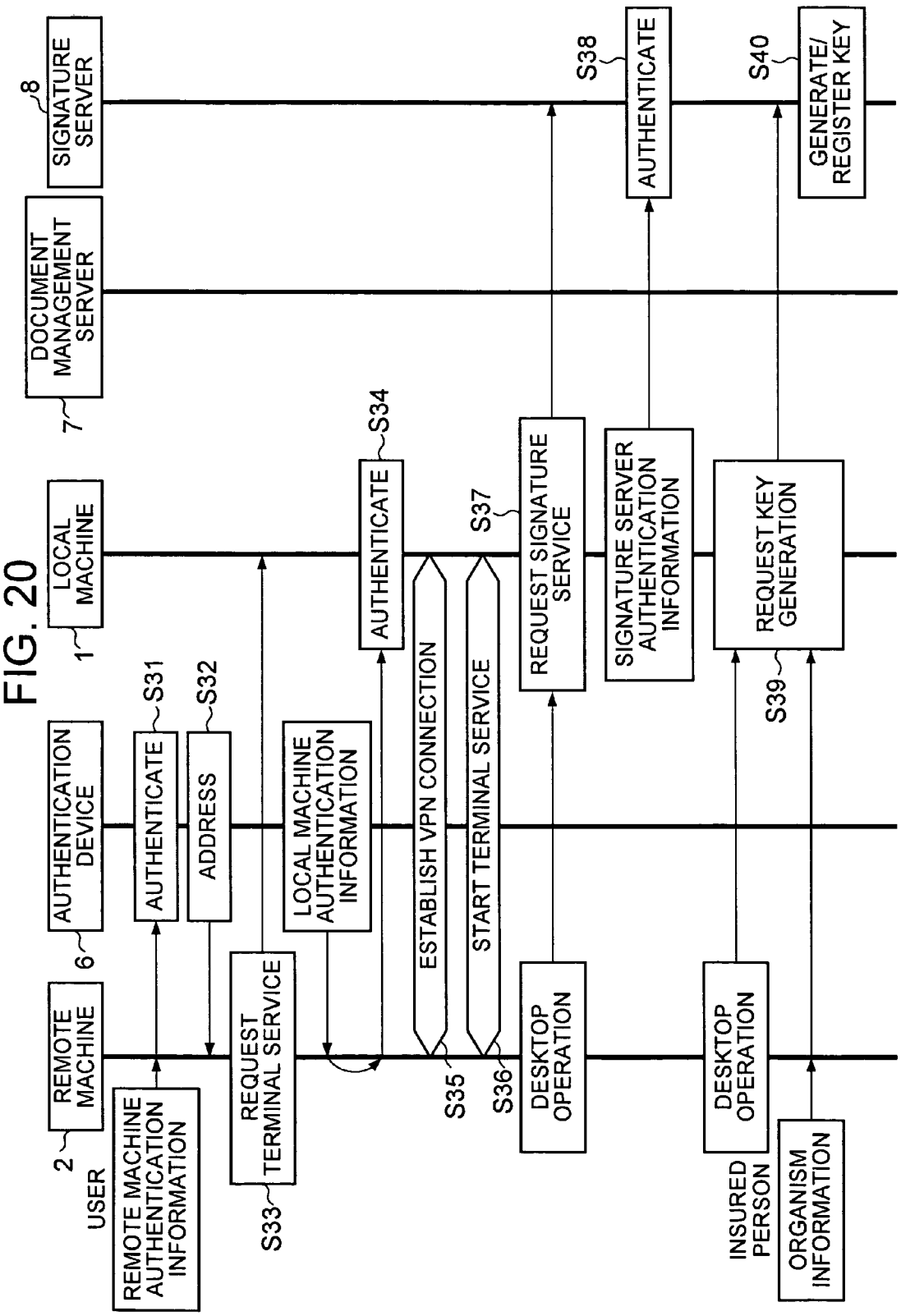

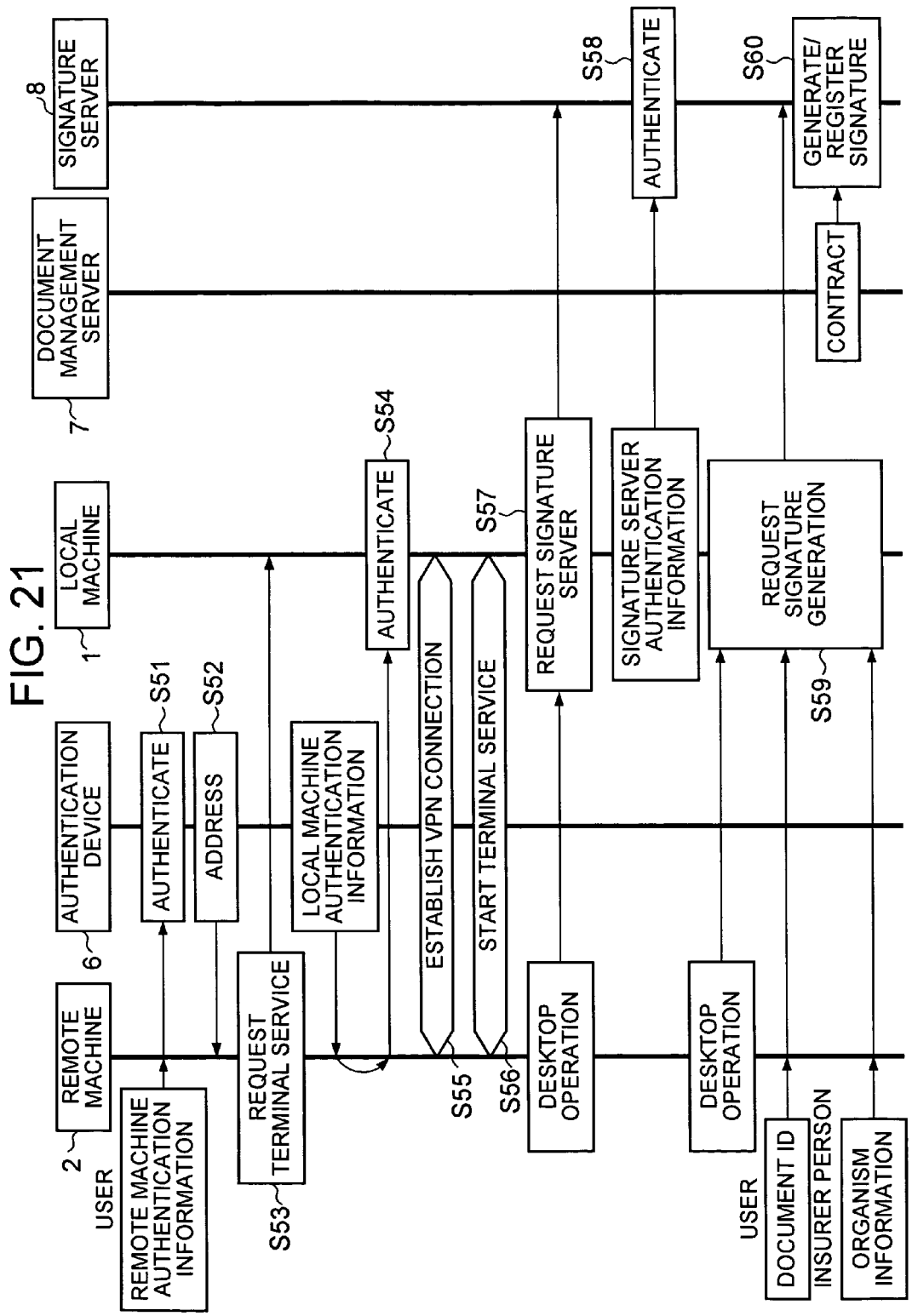

INFORMATION PROCESSING SYSTEM

BACKGROUND OF THE INVENTION

The present invention relates to a signature technology for document data, and more particularly to a signature technology for document data suited to an information processing system of a thin client type.

In recent years, attention has been focused on an information processing system of a so-called thin client type. In the information processing system of the thin client type, a user accesses a local machine installed at home or company from a remote machine at hand, and uses terminal services provided from the local machine to operate a desktop of the local machine by remote control, thereby using various application programs and data stored in the local machine. Not only a desktop personal computer (PC), but also a blade PC (i.e., blade computer) equipped with no locally connected input/output devices (e.g., keyboard, mouse, and display), or the like, may be used as the local machine (refer to, for example, Japanese Patent Laid-open Publication No. 2003-337672).

There is an information processing system of a thin client type which enables use of only a printer, an external drive, an external memory, or the like, locally-connected to a local machine or through a network by using, as a remote machine, a PC of a so-called HDD-less type configured to inhibit local or network connection to a printer, an external drive, an external memory (excluding a storage apparatus which stores authentication information for using terminal services of a local machine). With this type of information processing system, the possibility of information leakage caused by theft of the remote machine or the like can be reduced.

However, when the information processing system of this type is applied to an electronic contract system, the following problems occur. That is, consideration will be given to a case where a user such as an insurance agent uses a remote machine lent to him/her to generate an electronic signature of an insured person for contract data. To generate the electronic signature of the insured person, a signature key (secret key) of the insured person is necessary. However, the remote machine is configured to inhibit local or network connection to a printer, an external drive, an external memory, or the like. Accordingly, for example, the user cannot fetch the signature key of the insured person stored in an external memory from the external memory of the insured person.

The signature key has conventionally been moved from a key generation mechanism to an owner by, for example, storing the signature key in the external memory and delivering it to its owner or transmitting the signature key to a terminal of its owner through cryptocommunication. Thus, the movement is accompanied by security risks.

SUMMARY OF THE INVENTION

The present invention has been made in view of the above-mentioned situations, and it is an object of the invention to provide a signature technology for document data suited to an information processing system of a thin client type. Specifically, an electronic signature for document data is generated without fetching a signature key from a remote machine. Additionally, security risks which accompany a movement of the signature key are reduced.

To solve the problem, the present invention uses a signature support system which includes a remote machine, a local machine which provides terminal services to the remote machine, a document management server which provides document management services to the local machine, and a signature server which provides key services and signature services to the local machine.

The remote machine uses the terminal services of the local machine to access the document management server and correlates document data with a document ID, which is identification information of the document data, to register it in the document management server.

The remote machine uses the terminal services of the local machine to access the signature server; and causes the signature server to generate a pair of a signature key and a verification key, to correlate these with biological information read by a biological information reader, and to register them in the signature server.

Furthermore, the remote machine uses the terminal services of the local machine to access the signature server; and causes the signature server to generate signature data for document data correlated with a document ID received from a user and registered in the document management server by using the signature key correlated with the biological information read by the biological information reader and registered in the signature server.

For example, according to an aspect of the present invention, there is provided a signature support system which supports including a signature in document data, including:
a remote machine;
a local machine which provides terminal services to the remote machine;
a document management server which provides document management services to the local machine; and
a signature server which provides key services and signature services to the local machine, in which:
the document management server includes:
document data storing means which stores document data;
document management authenticating means which authenticates the local machine by using document management server authentication information; and
document management control means which correlates the document data with a document ID serving as identification information of the document data, to store the document data in the document data storing means, in accordance with an instruction from the local machine authenticated by the document management authenticating means, transmits the document data correlated with the document ID received from the signature server and stored in the document data storing means, in accordance with an instruction from the signature server, receives a signature ID as identification information of signature data for the document data from the signature server, and correlates the signature ID with the document data, to store the signature ID in the document data storing means;
the signature server includes:
signature data storing means which stores the signature data;
key storing means which stores a signature key and a verification key;
signature authenticating means which authenticates the local machine by using signature server authentication information;
key control means which generates a pair of a signature key and a verification key in accordance with an instruction from the local machine authenticated by the signature authenticating means, and correlates the pair of keys with biological information received from the local machine, to store the keys in the key storing means; and
signature control means which accesses the document management server to read the document data having the document ID received from the local machine, from the document management server in accordance with an instruction from the local machine authenticated by the signature authenticating means, reads from the key storing means the signature key correlated with the biological information received from the local machine and stored in the key storing means, generates signature data for the document data by using the signature key, correlates the signature data with a signature ID of the signature data to store the signature data in the signature data storing means, and notifies to the document management server of the signature ID;

the local machine includes:

local authenticating means which authenticates the remote machine by using local machine authentication information;

terminal service providing means which provides the terminal services to the remote machine authenticated by the local authenticating means;

document management server access control means which accesses the document management server by using preregistered document management server authentication information in accordance with an instruction from the remote machine using the terminal services; and signature server access control means which accesses the signature server by using preregistered signature server authentication information in accordance with an instruction from the local machine using the terminal services, the remote machine includes:

local machine authentication information input means which receives input of local machine authentication information;

biological information reading means which reads the biological information; and local machine access control means which accesses the local machine by using the local machine authentication information received by the local machine authentication information input means, to receive the terminal services of the local machine;

the document management server access control means registers the document data together with the document ID of the document data in the document management server in accordance with an instruction received from the remote machine via the terminal services; and the signature server access control means causes the signature server to generate a pair of a signature key and a verification key in accordance with an instruction received from the remote machine via the terminal services, and to correlate the pair of keys with the biological information received from the remote machine, to register the keys in the signature server, and causes the signature server to generate the signature data for the document data correlated with the document ID received from the remote machine and registered in the document management server by using the signature key correlated with the biological information received from the remote machine and stored in the key storing means, in accordance with an instruction received from the remote machine via the terminal services.

According to the present invention, it is possible to generate an electronic signature for document data without fetching a signature key from the remote machine. Moreover, it is possible to reduce security risks which accompany the movement of the signature key.

BRIEF DESCRIPTION OF THE DRAWINGS

In the accompanying drawings:

FIG. 1 is a diagram showing an example of a rough configuration of an electronic contract system according to an embodiment of the present invention;

FIG. 3 is a diagram schematically showing an authentication information management table;

FIG. 12 is a diagram schematically showing a template database;

FIG. 13 is a diagram schematically showing a contract database;

FIG. 16 is a diagram schematically showing a key database;

FIG. 17 is a diagram schematically showing a signature database;

FIG. 18 is a flowchart explaining an operation example of the signature server;

FIG. 19 is a diagram showing a rough operation example for creating contract data in the electronic contract system of the embodiment of the present invention;

FIG. 20 is a diagram showing a rough operation example for creating key data in the electronic contract system of the embodiment of the present invention; and FIG. 21 is a diagram showing a rough operation example for creating signature data in the electronic contract system of the embodiment of the present invention.

DESCRIPTION OF THE PREFERRED EMBODIMENTS

Figure 2:
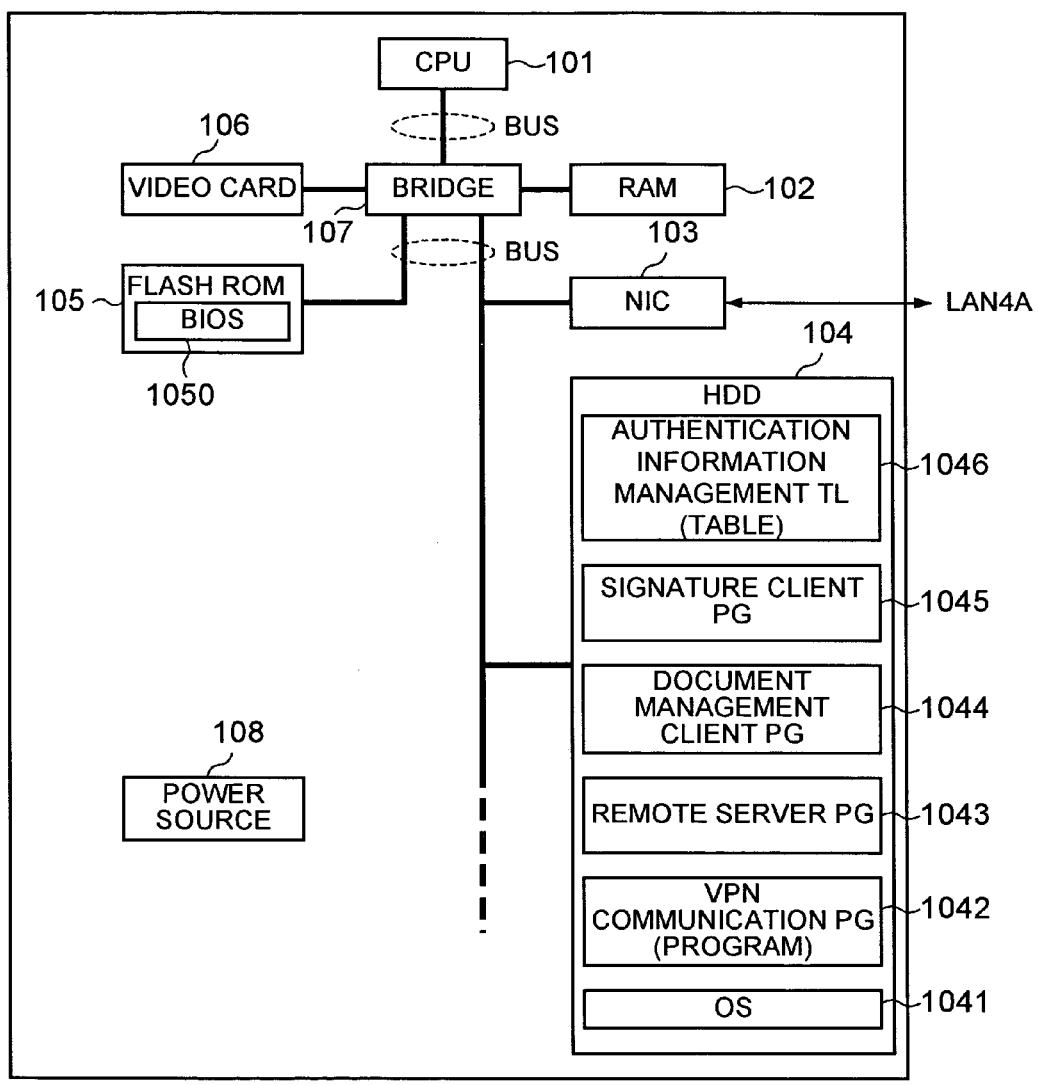
FIG. 2 is a diagram showing a rough configuration example of a local machine.

An embodiment of the present invention will be described below.

FIG. 1 shows an example of a rough configuration of an electronic contract system according to an embodiment of the present invention.

As shown in the figure, the electronic contract system of this embodiment includes a plurality of local machines 1, a plurality of remote machines 2, a plurality of authentication devices 6, a document management server 7, and a signature server 8. The plurality of local machines 1, the document management server 7, and the signature server 8 are connected to a local area network (LAN) 4A which is an internal network built in an insurance company or the like. The LAN 4A is connected to a wide area network (WAN) 5 via a router 3A. The authentication device 6 can be attached to/detached from the remote machine 2. The remote machine 2 is connected to a LAN 4B which is an external network built outside the company such as a hotel, a station or a home of an insured person. The LAN 4B is connected to the WAN 5 via a router 3B.

The local machine 1 configures a virtual private network (VPN) with the remote machine 2, and provides terminal services to the remote machines 2 via the VPN. In other words, input information (i.e., operation contents of an input device) sent from the remote machines 2 is received to be processed, and video information (i.e., desktop screen of a display) indicating a processing result is transmitted to the remote machines 2. For the local machines 1, a desktop personal computer (PC), a blade PC (i.e., blade computer) having no locally connected input/output devices (e.g., keyboard, mouse, or display), or the like is used.

FIG. 2 shows a rough configuration example of a local machine 1.

As shown in the figure, the local machine 1 includes a central processing unit (CPU) 101, a random access memory (RAM) 102 which functions as a work area of the CPU 101, a network interface card (NIC) 103 for connection to the LAN 4A, a hard disk drive (HDD) 104, a flash read-only memory (ROM) 105, a video card 106 which is used for generating video information of the desktop PC, a bridge 107 which is used for relaying an internal connection line such as a bus, BUS, to connect the units 101 to 106, and a power source 108.

The flash ROM 105 stores a basic input/output system (BIOS) 1050. The CPU 101 first accesses the flash ROM 105 to execute the BIOS) 1050 after the power source 108 is turned on, thereby recognizing a system configuration of the local machine 1.

The HDD 104 stores at least an operating system (OS) 1041, a VPN communication program 1042, a remote server program 1043, a document management client program 1044, a signature client program 1045, and an authentication information management table 1046.

The OS 1041 is a program which causes the CPU 101 to integrally control the units 102 to 108 of the local machine 1, and to execute programs 1042 to 1045 to be described below. The CPU 101 loads the OS 1041 from the HDD 104 to the RAM 102 to execute the OS 1041 according to the BIOS 1050. Accordingly, the CPU 101 integrally controls the units 102 to 108 of the local machine 1.

The VPN communication program 1042 is a communication program which is used for building a VPN with the remote machine 2, for example, a communication program using a security architecture for the Internet Protocol (IPsec). The CPU 101 loads the VPN communication program 1042 from the HDD 104 to the RAM 102 to execute the VPN communication program 1042 according to the OS 1041. Thus, the CPU 101 configures a VPN with the remote machine 2 in response to a communication start request received from the remote machine 2 via the NIC 103, and communicates with the remote machine 2 via the VPN.

The remote server program 1043 is a program which is used for providing terminal services; that is, for remote-controlling the desktop PC of the local machine 1 from the remote machine 2 An example of a remote of which is a server program for virtual network computing (VNC) developed at AT&T Laboratories Cambridge. The CPU 101 loads the remote server program 1043 from the HDD 104 to the RAM 102 to execute the remote server program 1043 according to the OS 1041. Thus, the CPU 101 receives and processes input information (i.e., operation contents of the keyboard and the mouse) sent from the remote machine 2 via the VPN, and transmits video information (i.e., desktop screen of the display) indicating a processing result to the remote machine 2 via the VPN.

The document management client program 1044 is a program which is used for receiving services (i.e., document management services) provided by the document management server 7.

The signature client program 1045 is a program which is used for receiving services (i.e., key and signature generation services) provided by the signature server 8.

As shown in FIG. 3, the authentication information management table 1046 registers local machine authentication information (i.e., a user ID or password) 10461, based on which the remote server program 1043 authenticates the remote machine 2 as a receiver of the terminal services, document management server authentication information (i.e., a user ID or password) 1042, based on which the document management server 7 authenticates the local machine 1 as a receiver of the document management services, and signature server authentication information (i.e., a user ID or password) 1043, based on which the signature server 8 authenticates the local machine 1 as a receiver of the key and signature generation services.

Figure 4:
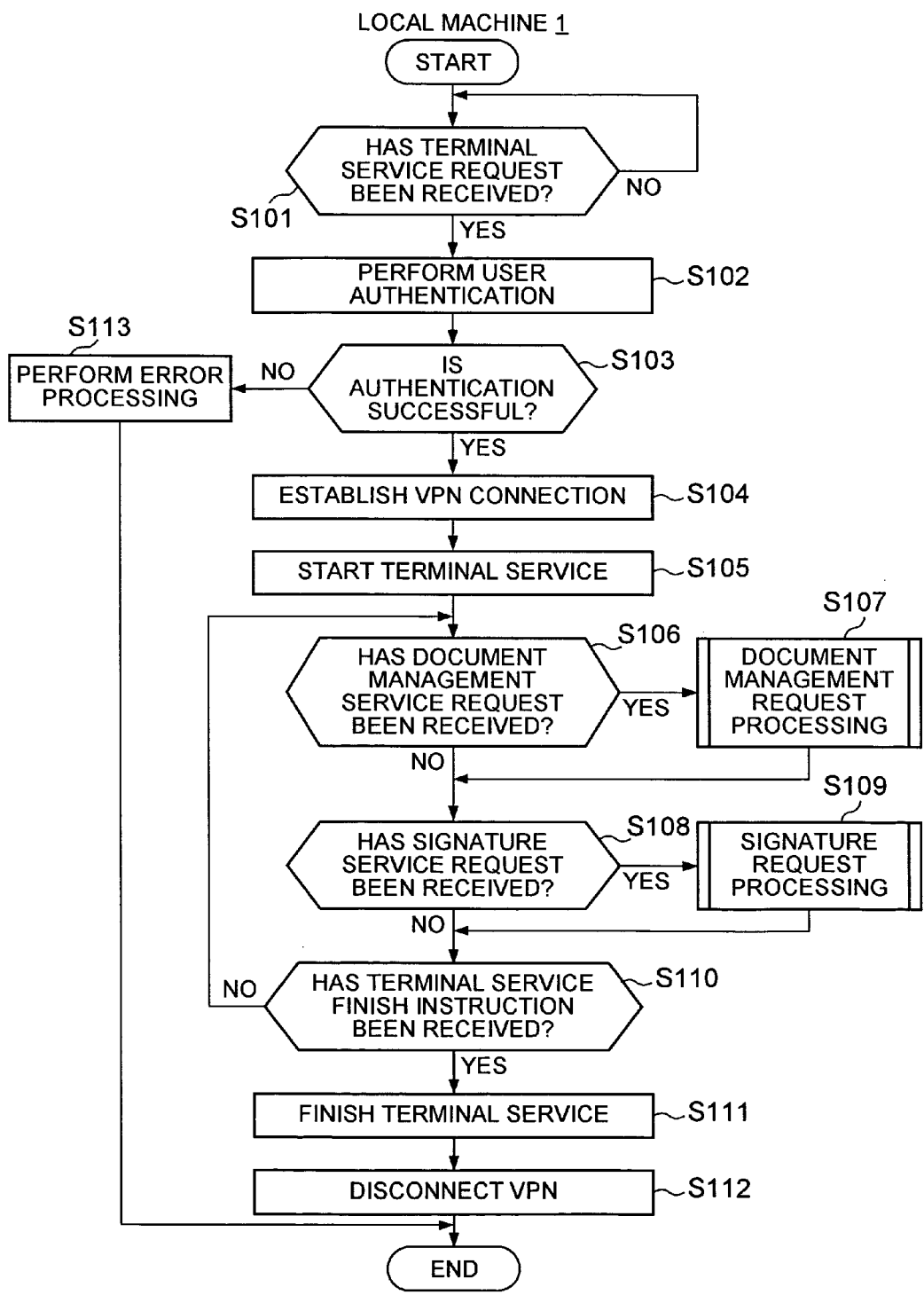
FIG. 4 is a flowchart showing an operation example of the local machine.

FIG. 4 is a flowchart for explaining an operation example of the local machine 1.

This process flow is normally executed by the CPU 101 according to the program. However, to simplify explanation, the flow will be described by setting the program as a principal executor.

Upon reception of a terminal service request from the remote machine 2 via the NIC 103 (YES in Step S101), the OS 1041 notifies this to the remote server program 1043. The remote server program 1043 transmits a terminal service request response to the remote machine 2, and prompts the remote machine 2 to transmit local machine authentication information. Upon reception of the local machine authentication information from the remote machine 2, judgment is made as to whether this information matches the local machine authentication information registered in the authentication information management table 1046 or not to execute user authentication (Step S102). If the user authentication fails (NO in Step S103), the remote server program 1043 executes predetermined error processing such as transmission of an error message to the remote machine 2 (Step S113) to finish the flow.

On the other hand, if the user authentication succeeds (YES in Step S103), the remote server program 1043 requests the VPN communication program 1042 to establish a VPN connection. Upon reception of this request, the VPN communication program 1042 establishes a VPN connection with the remove machine 2 of a terminal service request transmission source via the OS 1041 and the NIC 103 (Step S104).

After the VPN connection has been established, the remote server program 1043 starts providing terminal services to the remote machine 2 via the VPN (Step S105). Specifically, upon reception of input information from the remote machine 2 via the NIC 103, this input information is notified to a predetermined active program (i.e., the document management client program 1044 or the signature client program 1045) by the remote server program 1043. The program that has received this input information executes processing according to operation contents (i.e., keyboard and mouse operations) indicated by the input information. Then, in the RAM 102, video information (e.g., color information, draw command information, and bitmap information) indicating a desktop screen reflecting a processing result is generated. The remote server program 1043 transmits this video information to the remote machine 2 via the NIC 103.

Upon reception of a document management service request from the remote machine 2 via the remote server program 1043 (YES in Step S106), the document management client program 1044 executes document management request processing to be described below (Step S107).

Upon reception of a signature service request from the remote machine 2 via the remote server program 1043 (YES in Step S108), the signature client program 1045 executes signature request processing to be described below (YES in Step S109).

Upon reception of a terminal service finish instruction from the terminal machine 2 (YES in Step S110), the remote server program 1043 finishes the providing of the terminal services to the remote machine 2 (Step S111). Then, the remote server program 1043 requests the VPN communication program 1042 to disconnect the VPN. The VPN communication program 1042, that has received this request disconnects the VPN established with the remote machine 2 via the OS 1041 and the NIC 103 (Step S112).

Figure 5:
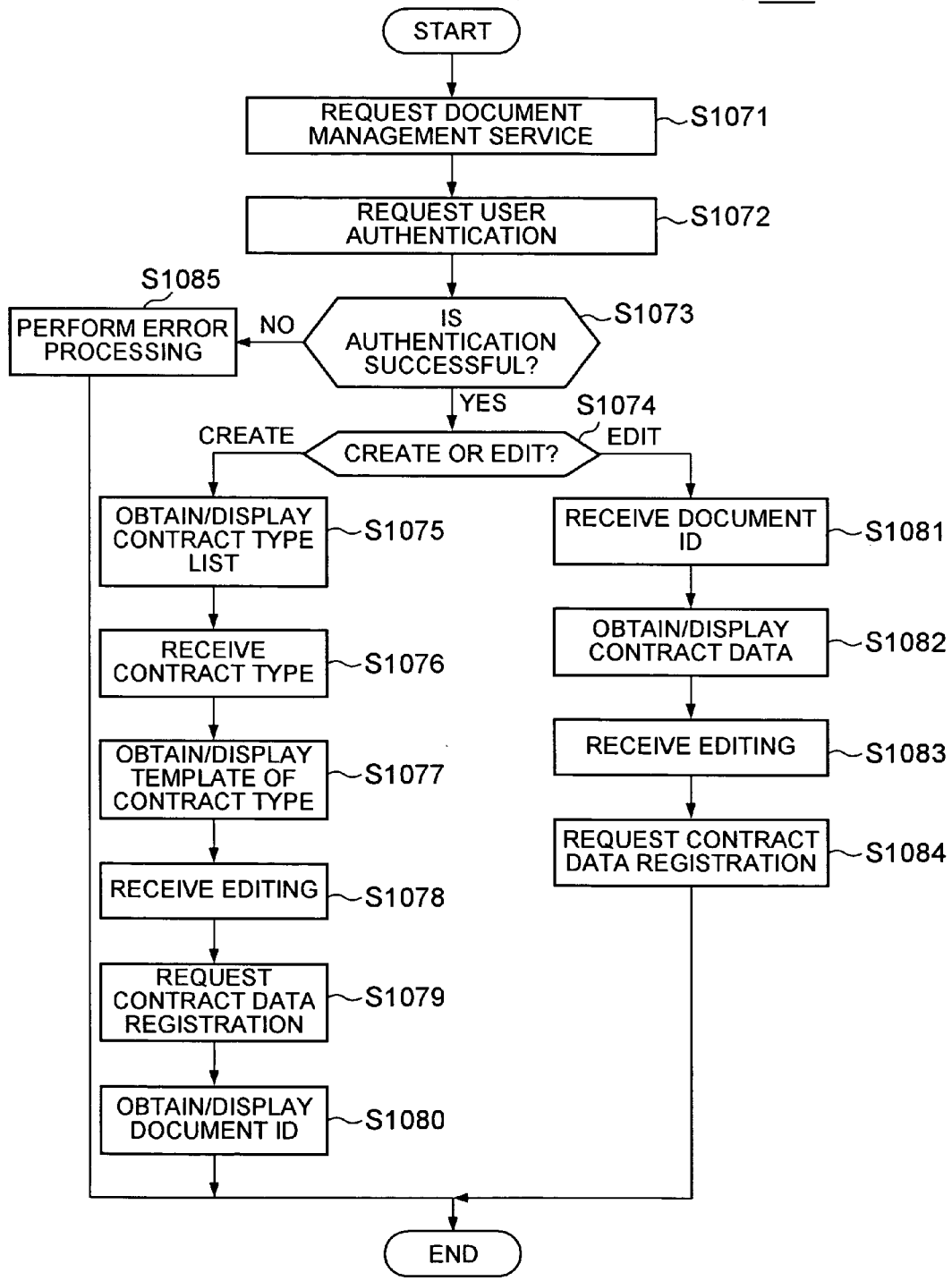
FIG. 5 is a flowchart explaining document management request processing, shown in FIG. 4.

FIG. 5 is a flowchart showing the document management request processing (Step S107) of FIG. 4.

First, the document management client program 1044 transmits a document management service request to the document management server 7 via the OS 1041 and the NIC 103 (Step S1071). Upon reception of a document management service response from the document management server 7, the document management server authentication information 1042 is read from the authentication information management table 1046, and transmitted to the document management server 7, and the document management server 7 is requested to execute user authentication (Step S1072), and waits for the arrival of an authentication result from the document management server 7.

If the authentication result received from the document management server 7 shows an authentication failure (NO in Step S1073), the document management client program 1044 executes predetermined error processing such as displaying of an error message on the desktop screen (displayed in the remote machine 2 by the terminal services) (Step S1085) to finish the flow.

On the other hand, if the authentication result received from the document management server 7 shows an authentication success (YES in Step S1073), the document management client program 1044 displays an input screen, which is used for checking whether to newly create or edit contract data, on the desktop screen, and receives an instruction to newly create or edit the contract data from the user of the remote machine 2 in which the desktop screen is displayed by the terminal services (Step S1074).

If the received instruction is to newly create contract data in Step S1074, the document management client program 1044 transmits a contract type template list data request to the document management server 1075, receives the contract type template list data from the document management server 1075, and displays this data on the desktop screen (Step S1075). The contract type template list data is data in which various pieces of information (e.g., contract type) of template data of a contract prepared beforehand are described.

Next, the document management client program 1044 receives a contract type from the user of the remote machine 2 in which this desktop screen is displayed by the terminal services (Step S1076). The document management client program 1044 transmits the received contract type to the document management server 7. Then, template data is received from the document management server 7 to be displayed on the desktop screen (Step S1077).

The document management client program 1044 receives editing of the template data from the user of the remove machine 2 in which this desktop screen is displayed by the terminal services (Step S1078). According to an instruction of the user of the remote machine 2, the edited template data is transmitted as contract data (i.e., no signature) of an insured person as a client of the user, to the document management server 7, and the document management server 7 is requested to register the contract data (Step S1079). Subsequently, upon reception of a document ID given to the contract data from the document management server 7, the document management client program 1044 displays the document ID on the desktop screen (Step S1080). Then, this flow is finished.

If the received instruction is editing of the contract data in Step S1074, the document management client program 1044 displays a reception screen of the document ID on the desktop screen, and receives a document ID from the user of the remote machine 2 in which this desktop screen is displayed by the terminal services (Step S1081). The document management client program 1044 transmits the received document ID to the document management server 7. Then, the contract data is received from the document management server 7 to be displayed on the desktop screen (Step S1082).

The document management client program 1044 receives editing of the contract data from the user of the remote machine 2 in which the desktop screen is displayed by the terminal services (Step S1083). According to an instruction of the user of the remote machine 2, the edited contract data is transmitted to the document management server 7, and the document management server 7 is requested to register this contract data (Step S1084). Then, this flow is finished.

Figure 6:
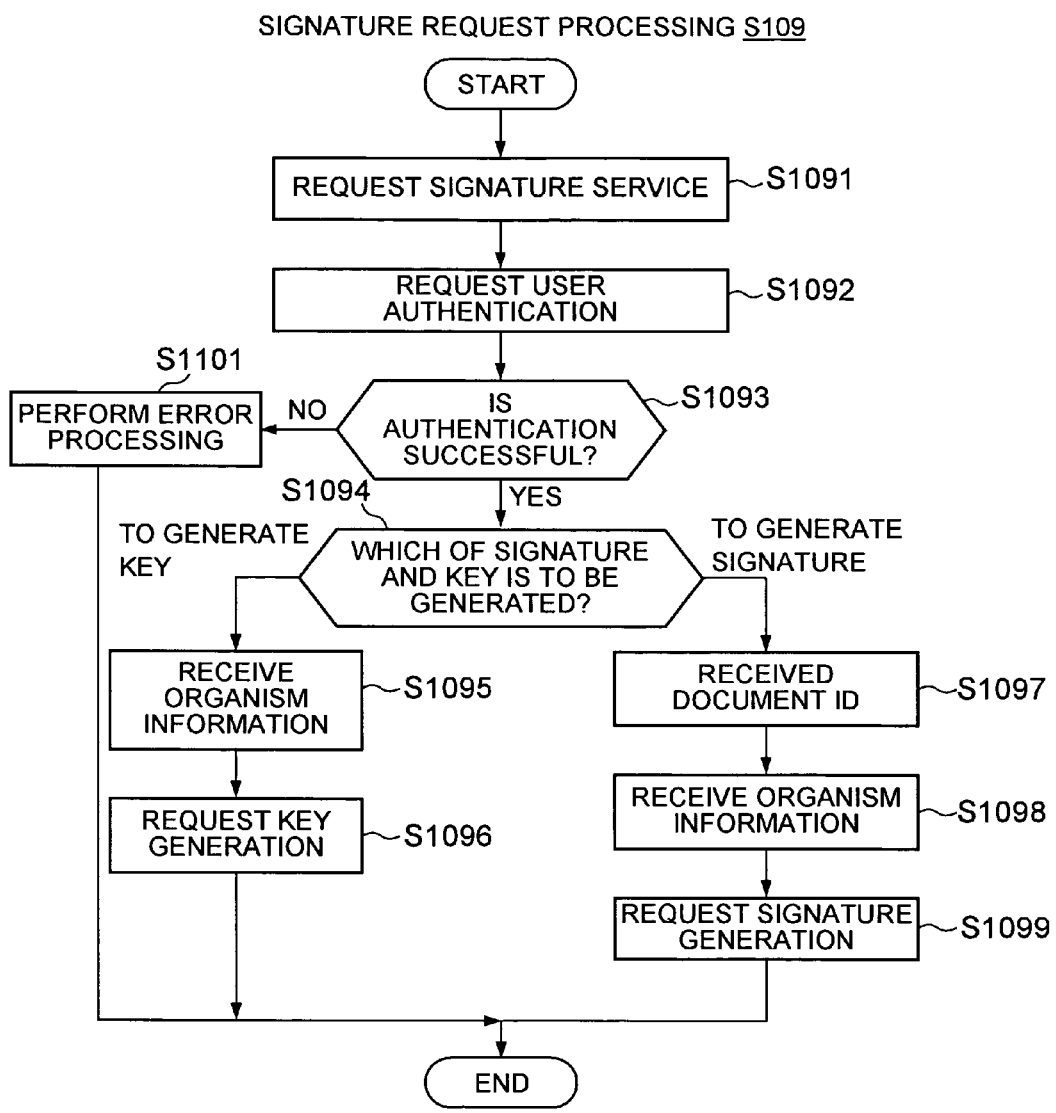
FIG. 6 is a flowchart explaining signature request processing shown in FIG. 4.

FIG. 6 is a flowchart for explaining signature request processing (Step S109) of FIG. 4.

First, the signature client program 1045 transmits a signature service request to the signature server 8 via the OS 1041 and the NIC 103 (Step S1091). Upon reception of a signature service response from the signature server 8, the signature server authentication information 1043 is read from the authentication information management table 1046, and transmitted to the signature server 8, and the signature server 8 is requested to execute user authentication (Step S1092). Then, the signature client program 1045 waits for the arrival of an authentication result from the signature server 8.

If the authentication result received from the signature server 8 shows an authentication failure (NO in Step S1093), the signature client program 1045 executes predetermined error processing such as displaying of an error message on the desktop screen (displayed in the remote machine 2 by the terminal services) (Step S1101) to finish the flow.

On the other hand, if the authentication result received from the signature server 8 shows an authentication success (YES in Step S1093), the signature client program 1045 displays an input screen, which is used for checking whether to generate a signature for the contract data or a signature key (i.e., secret key) and a verification key (i.e., public key) used for a signature and signature verification, on the desktop screen, and receives an instruction to generate a signature or keys from the user of the remote machine 2 in which the desktop screen is displayed by the terminal services (Step S1094)

If the received instruction is key generation in Step S1094, the signature client program 1045 displays a message requesting biological information (e.g., finger vein information) of the insured person as a client of the user of the remote machine 2, and receives biological information from the remote machine 2 in which this desktop screen is displayed (Step S1095). Then, a key generation request including this biological information is generated, and transmitted to the signature server 8 (Step S1096). Then, this flow is finished.

If the received instruction is signature generation in Step S1094, the signature client program 1045 displays a reception screen of the document ID on the desktop screen, and receives a document ID from the user of the remote machine 2 in which this desktop screen is displayed by the terminal services (Step S1097). The signature client program 1045 displays a message of requesting the biological information of the insured person as the client of the user of the remote machine 2 on the desktop screen, and receives the biological information from the remote machine 2 in which this desktop screen is displayed by the terminal services (Step S1098). A signature generation request including the document ID and the biological information is generated, and transmitted to the signature server 8 (Step S1099). Then, this flow is finished.

The description will be continued referring back to FIG. 1.

A remote machine 2 receives the terminal services from a local machine 1. In other words, a VPN is built with the local machine 1, input information (i.e., operation contents of the input device) input to the remote machine 2 itself is transmitted to the local machine 1, video information (i.e., desktop screen of the display) is received from the local machine 1, and the video information is displayed in the display of the remote machine 2 itself.

The remote machine 2 is a PC of a so-called HDD-less type, and configured to inhibit local or network connection of a printer, an external drive, and an external memory (excluding the authentication device 6). In other words, the remote machine 2 is permitted to use only the printer, the external drive, the external memory, and the like, connected to the local machine 1 locally or through a network. Thus, a possibility of information leakage caused by theft of the remote machine 2 or the like is reduced.

Figure 7:
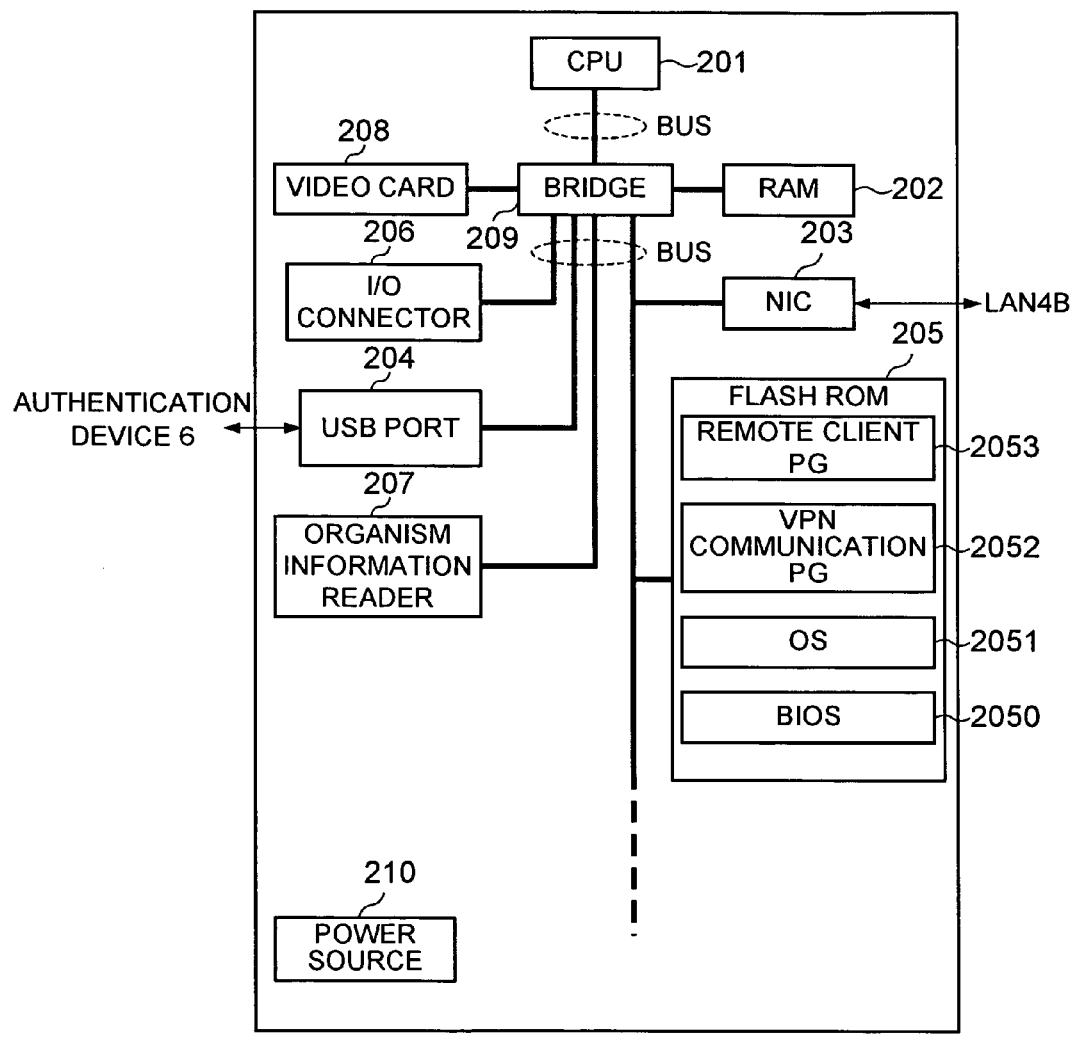
FIG. 7 is a diagram showing a rough configuration example of a remote machine.

FIG. 7 shows a rough configuration example of the remote machine 2.

As shown in the figure, the remote machine 2 includes a CPU 201, a RAM 202 which functions as a work area of the CPU 201, a NIC 203 for connection to a LAN 4B, a USB port 204 which is used for connecting an authentication device (USB device) 6, a flash ROM 205, an I/O connector 206 which is used for connecting a keyboard and a mouse, a biological information reader 207 which reads biological information (e.g., finger vein information), a video card 208 which is used for connecting a display, a bridge 209 which is used for relaying a bus, BUS, to connect the units 201 to 208, and a power source 210.

The flash ROM 205 stores at least a BIOS 2050, an OS 2051, a VPN communication program 2052, and a remote client program 2053.

The CPU 201 first accesses the flash ROM 205 to execute the BIOS 2050 after the power source 210 is turned on, thereby recognizing a system configuration of the remote machine 2.

The OS 2051 is a program which causes the CPU 201 to integrally control the units 202 to 210 of the remote machine 2, and to execute programs 2052 and 2053 to be described below. The CPU 201 loads the OS 2051 from the flash ROM 205 to the RAM 202 to execute the OS 2051 according to the BIOS 2050. Accordingly, the CPU 201 integrally controls the units 202 to 210 of the remote machine 2. For the OS 2051 of this embodiment, an OS of a relatively small size such as an embedded OS that can be stored in the flash ROM 205 is used.

The VPN communication program 2052 is a communication program which is used for building a VPN with the local machine 1, for example, a communication program using IPsec. The CPU 201 loads the VPN communication program 2052 from the flash ROM 205 to the RAM 202 to execute the VPN communication program 2052 according to the OS 2051. Thus, the CPU 201 builds a VPN with the local machine 1 allocated to the own remote machine 2 via the NIC 203.

The remote client program 2053 is a program which is used for receiving terminal services, in other words, used for causing the remote machine 2 to access the desktop PC of the local machine 1 from a remote place, for example, a client (i.e., viewer) of VNC. The CPU 201 loads the remote client program 2053 from the flash ROM 205 to the RAM 202 to execute the remote client program 2053 according to the OS 2051. Thus, the CPU 201 transmits input information (i.e., operation contents of the keyboard and the mouse) of the I/O connector 206 to the local machine 1 via the VPN, and outputs video information (i.e., desktop screen of the display) sent from the local machine 1 via the VPN to a display (not shown) connected to the video card 208.

Figure 8:
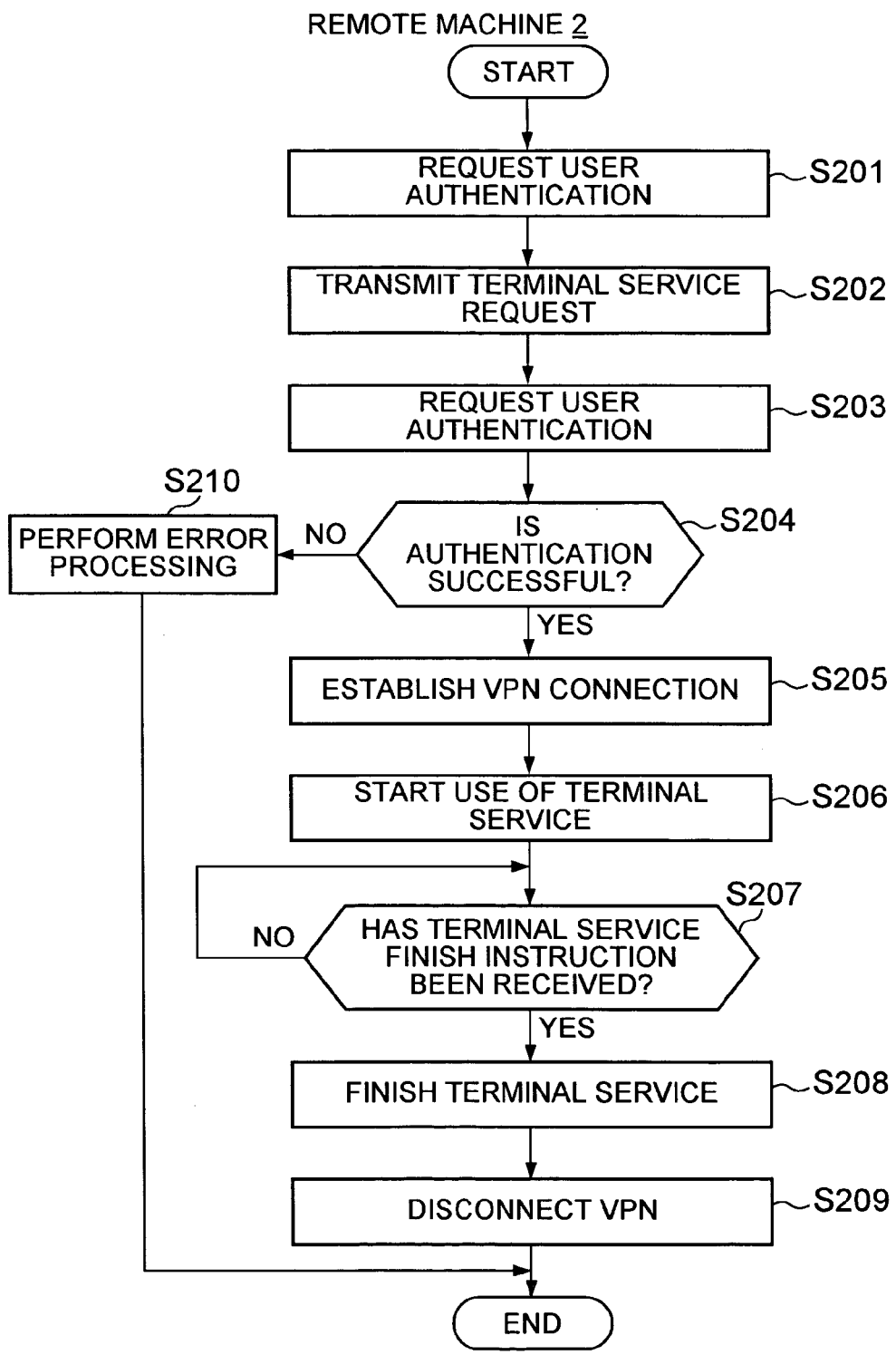
FIG. 8 is a flowchart explaining an operation example of the remote machine.

FIG. 8 is a flowchart explaining an operation example of the remote machine 2.

This process flow is normally executed by the CPU 201 according to the program. However, to simplify explanation, the flow will be described by setting the program as a principal executor.

First, the OS 2051 starts the remote client program 2053. Then, the remote client program 2053 causes the display connected to the video card 208 to display an input form for remote machine authentication information (i.e., a user ID and password), and receives input of the remote machine authentication information from the user via the keyboard and the mouse connected to the I/O connector 206. The received remote machine authentication information is transmitted to the authentication device 6 connected to the USB port 204, to request user authentication (Step S201). After the user authentication succeeds at the authentication device 6 and address information of the local server 1 is obtained from the authentication device 6, the remote client program 2053 transmits a terminal service request to the local machine 1 specified by this address information (Step S202). Upon reception of a terminal service request response from the local machine 1, the remote client program 2053 reads local machine authentication information from the authentication device 6, transmits the information to the local machine 1, and requests the local machine 1 to execute user authentication (Step S203). Then, the remote client program 2053 waits for the arrival of an authentication result from the local machine 1.

If the authentication result received from the local machine 1 shows an authentication failure (NO in Step S204), the remote client program 2053 executes predetermined error processing such as displaying of an error message on the desktop screen (Step S210) to finish the flow.

On the other hand, if the authentication result received from the local machine 1 shows an authentication success (YES in Step S204), the remote client program 2053 requests the VPN communication program 2052 to establish a VPN connection. Upon receipt of this request, the VPN communication program 2052 establishes a VPN connection with the local machine 1 of a terminal service providing source via the OS 2051 and the NIC 203 (Step S205).

After the VPN connection has been established, the remote client program 2053 starts using the terminal services provided by the local machine 1 via the VPN (Step S2067). Specifically, upon reception of input information from the input device via the I/O connector 206, this input information is transmitted to the local machine 1 via the NIC 203. Video information to draw a desktop screen of the local machine 1 is received from the local machine 1 via the NIC 203, and the video information is processed for displaying in the display connected to the video card 208.

Upon reception of a terminal service finish instruction from the input device via the I/O connector 206 (YES in Step S207), the remote client program 2053 transmits the terminal service finish instruction to the local machine 1 to finish the use of the terminal services (Step S208). Then, the remote client program 2053 requests the VPN communication program 2052 to disconnect the VPN. Upon reception of this request, the VPN communication program 2052 disconnects the VPN established with the remote machine 2 via the OS 2051 and the NIC 203 (Step S209).

The description will be continued referring back to FIG. 1.

The authentication device 6 authenticates remote machine authentication information received from the remote machine 2, and notifies an authentication result to the remote machine 2. If the authentication result shows authentication success, the authentication device 6 notifies the address of the local machine 1 registered in the authentication device 6, together with the authentication result, to the remote machine 2. In addition, the authentication device 6 reads the local machine authentication information to notify the information to the remote machine 2 according to an instruction from the remote machine 2 whose authentication has succeeded.

Figure 9:
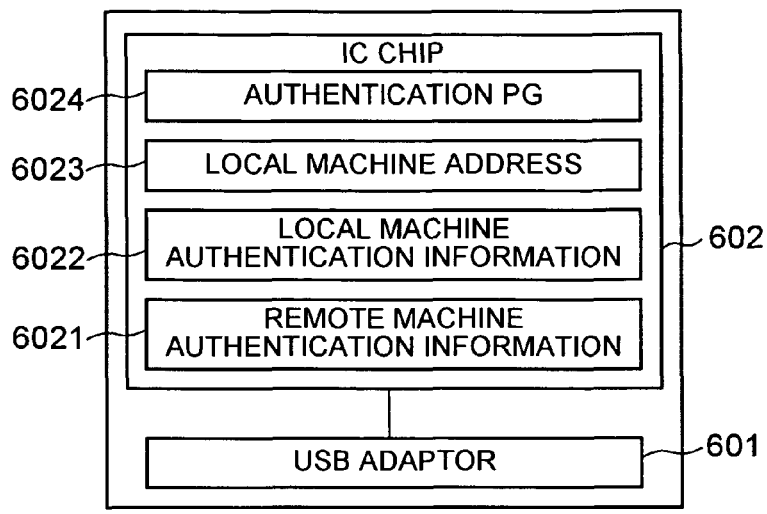
FIG. 9 is a diagram showing a rough configuration example of an authentication device.

FIG. 9 is a schematic diagram of the authentication device 6. As shown in the figure, the authentication device 6 includes a USB adaptor 601 connected to the USB port 204 of the remote machine 2, and an IC chip 602.

The IC chip 602 stores remote machine authentication information 6021, local machine authentication information 6022, local machine address information 6023, and an authentication program 6024. Note that an external flash memory may be mounted to the authentication device 6, and partial data of the IC chip 602 may be stored in this flash memory.

The authentication program 6024 is a program which executes user authentication by using the user ID and the password input to the remote machine 2 to which the authentication device 6 itself is connected, and the remote machine authentication information 6021.

The USB adaptor 601 of the authentication device 6 is connected to the USB port 204 of the remote machine 2. Accordingly, when power is supplied from the remote machine 2 to the authentication device 6, the IC chip 602 executes the authentication program 6024.

Figure 10:
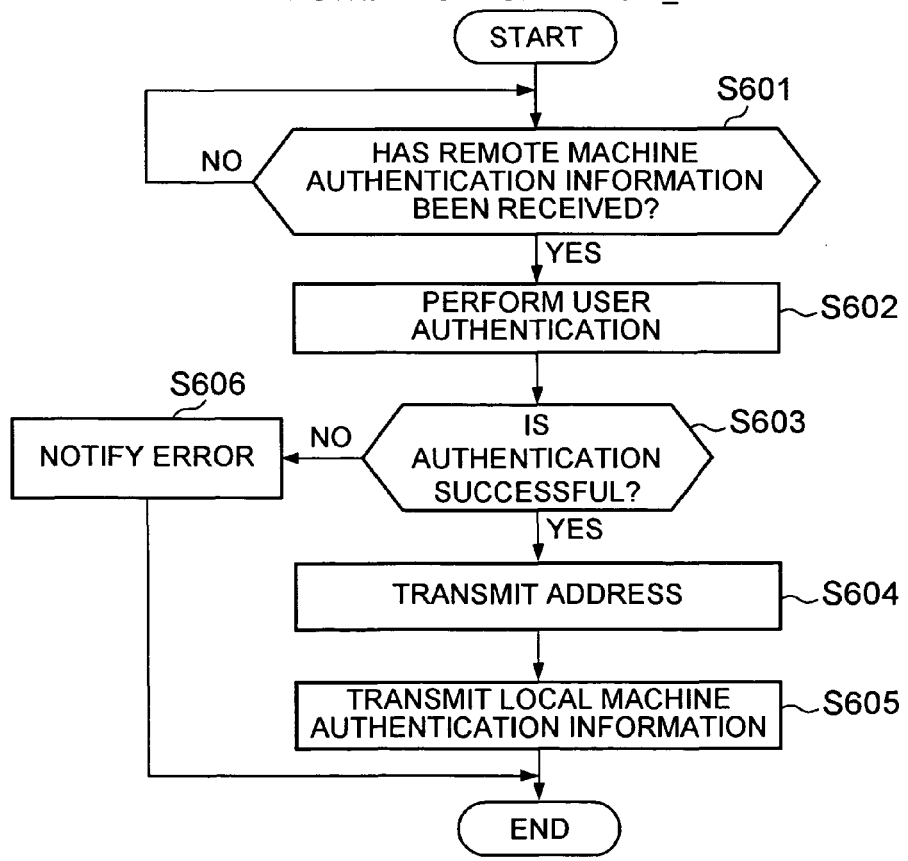
FIG. 10 is a flowchart explaining operation example of the authentication device.

FIG. 10 is a flowchart explaining operation of the authentication device 6. This flow is normally executed by the IC chip 602 according to the program. However, to simplify the explanation, the flow will be described by using the program as a principle executor.

First, upon receipt of the remote machine authentication information from the remote machine 2 (Step S601), the authentication program 6024 compares this remote machine authentication information with the remote machine authentication information 6021 stored in the IC chip 602 to execute user authentication (Step S602). If the two do not match each other (NO in Step S603), predetermined error processing such as outputting of an authentication result indicating an authentication failure to the remote machine 2 is executed (Step S606) to finish the flow.

On the other hand, if the two match each other (YES in Step S603), the address information 6023 of the local machine 1 stored in the IC chip 602 is output to the remote machine 2 (Step S604). Then, the authentication program 6024 reads the local machine authentication information 6022 from the IC chip 602 to output the local machine authentication information 6022 to the remote machine 2 according to an instruction from the remote machine 2 (Step S605).

The description will be continued referring back to FIG. 1.

The document management server 7 manages contract data of an insured person as a client of the user created by the user of the remote machine 1.

Figure 11:
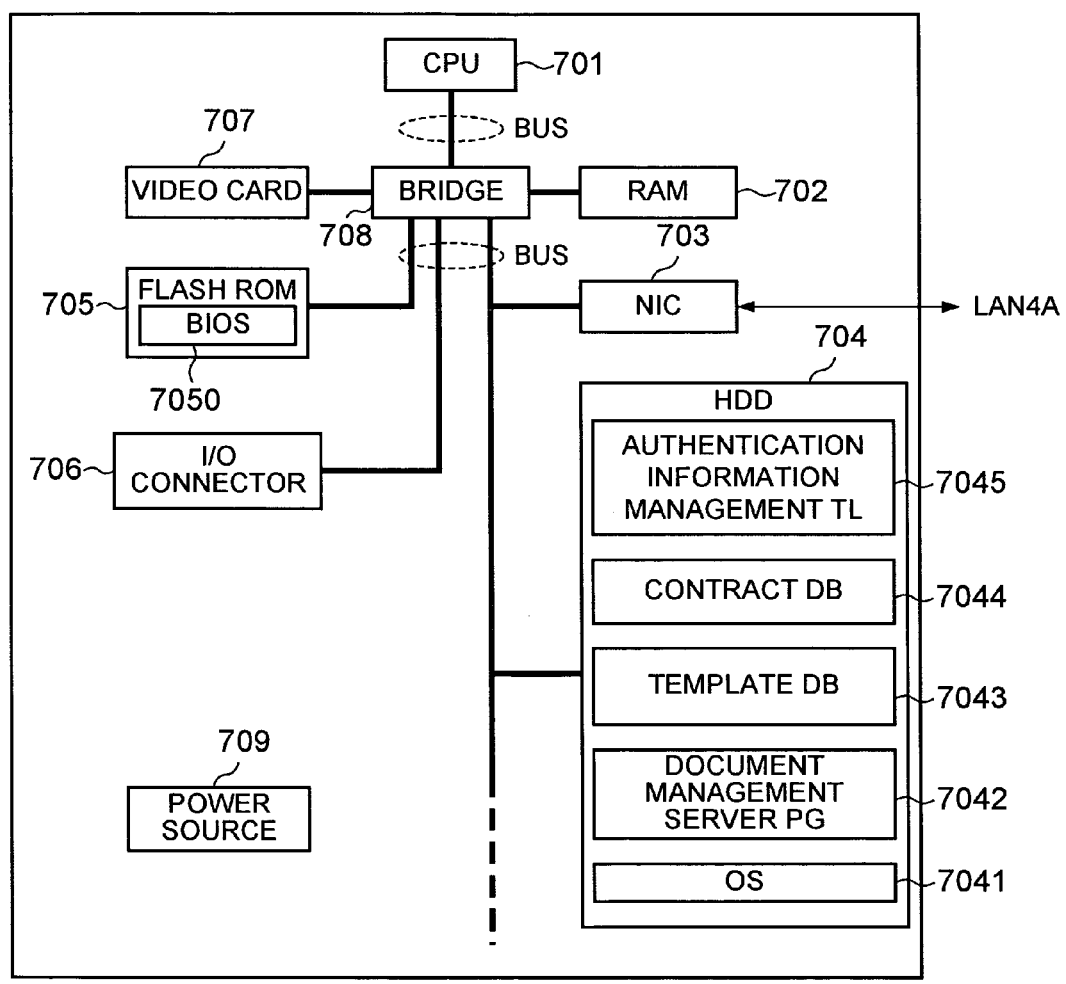
FIG. 11 is a diagram showing a rough configuration example of a document management server.

FIG. 11 is a schematic diagram of the document management server 7. As shown in the figure, the document management server 7 includes a CPU 701, a RAM 702 which functions as a work area of the CPU 701, a NIC 703 for connection to a LAN 4A, an HDD 704, a flash ROM 705, an I/O connector 706 which is used for connecting a keyboard and a mouse, a video card 707 which is used for connecting a display, a bridge 708 which relays a bus, BUS, to connect the units 701 to 707, and a power source 709.

The flash ROM 705 stores a BIOS 7050. The CPU 701 first accesses the flash ROM 705 to execute the BIOS 7050 after the power source 709 is turned on, thereby recognizing a system configuration of the document management server 7.

The HDD 704 stores at least an OS 7041, a document management server program 7042, a template database 7043, a contract database 7044, and an authentication information management table 7045.

The OS 7041 is a program which causes the CPU 701 to integrally control the units 702 to 709 of the document management server 7, and to execute the document management server program 7042. The CPU 701 loads the OS 7041 from the HDD 704 to the RAM 702 to execute the OS 7041 according to the BIOS 7050. Accordingly, the CPU 701 integrally controls the units 702 to 709.

The document management server program 7042 is a program which is used for providing document management services to the local machine 1. The document management server program 7042 assists creation of new contract data by the user of the remote machine 2 which receives the terminal services of the local machine 1 by using the template database 7043. The document management server program 7042 assists updating of the contract data by the user of the remote machine 2 which receives the terminal services of the local machine 1 by using the contract database 7044. In addition, the document management server program 7042 reads contract data of a signature target from the contract database 7044 to transmit it to the signature server 8.

In the template database 7043, template data which becomes a source of contract data of a certain type is registered for each contract type such as life insurance or accident insurance. FIG. 12 schematically shows registered contents of the template database. As shown in the figure, a record 70430 is registered for each contract type. The record 70430 includes a field 70431 which registers contract type, and a field 70432 which registers template data (i.e., binary data) of a contract.

In the contract database 7044, contract data created by the user of the remote machine 1 is registered. FIG. 13 schematically shows registered contents of the contract database 7044. As shown in the figure, a record 70440 is registered for each contract data. The record 70440 includes a field 70441 which registers a document ID, a field 70442 which registers contract data (i.e., binary data), a field 70443 which registers a user ID (i.e., user ID of document management server authentication information) of a user who has created the contract data, and a field 70444 which registers identification information (i.e., a signature ID) of signature data of an insured person with respect to the contract data.

In the authentication information management table 7045, document management server authentication information (i.e., a user ID and password) of each user of the remote machine 2 which can use document management services is registered.

Figure 14:
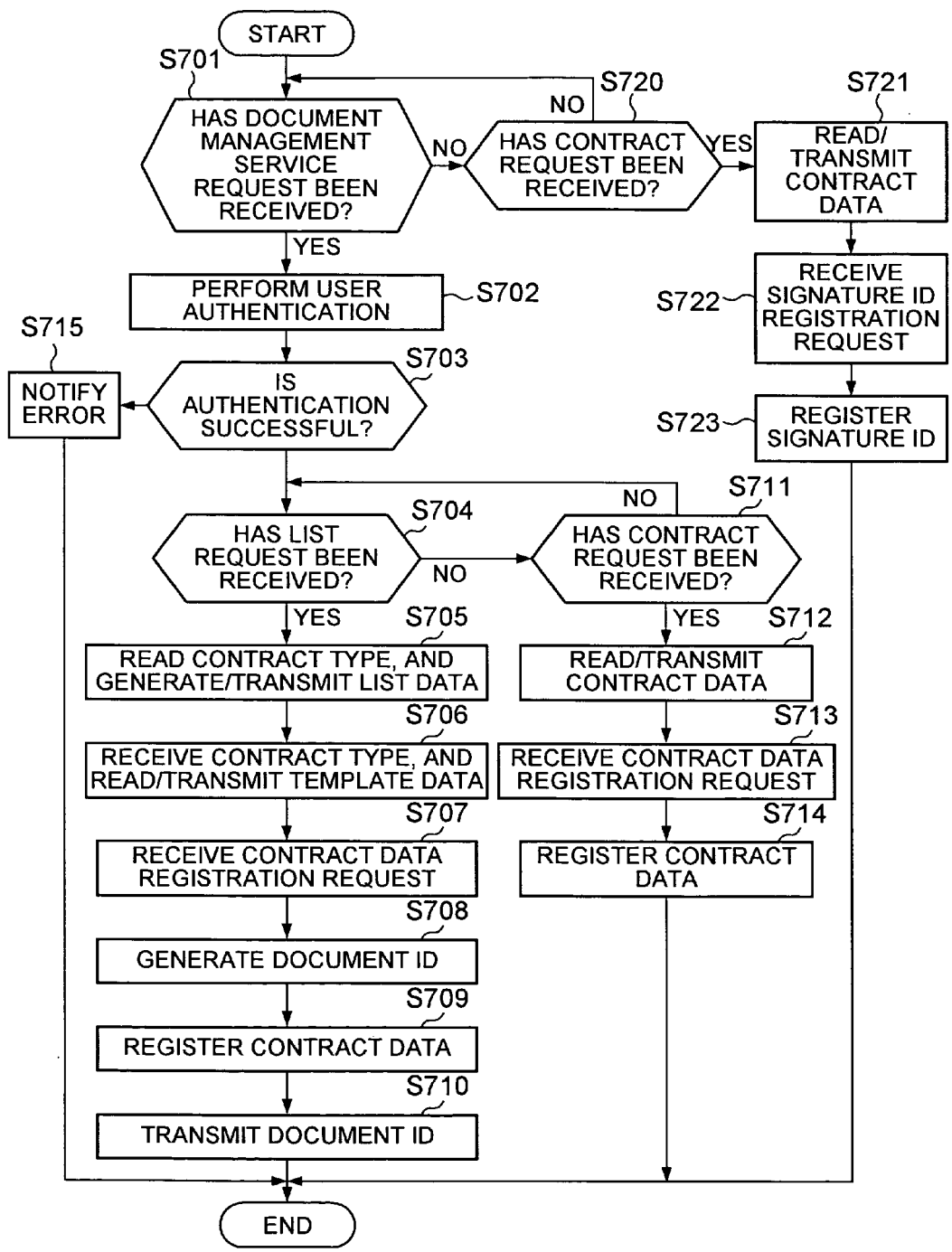
FIG. 14 is a flowchart explaining an operation example of the document management server.

FIG. 14 shows an operation of the document management server 7. This process flow is normally executed by the CPU 701 according to the program. However, to simplify explanation, the flow will be described by setting the program as a principal executor.

Upon reception of a document management service request from the local machine 1 via the OS 7041 and the NIC 703 (YES in Step S701), the document management server program 7042 transmits a document management service response to the local machine 1, and waits for arrival of the document management server authentication information from the local machine 1. Then, by investigating whether the document management server authentication information received from the local machine 1 has been registered in the authentication information table 7045, user authentication is carried out (Step S702).

If the user authentication fails (NO in Step S703), the document management server program 7042 executes predetermined error notification such as transmission of an authentication result indicating the authentication failure to the local machine 1 (Step S715) to finish the flow. On the other hand, if the user authentication succeeds (YES in Step S703), the document management server program 7042 transmits an authentication result indicating the authentication success to the local machine 1, and waits for a request from the local machine 1.

Upon reception of a contract type list request from the local machine 1 in which the user authentication has succeeded (YES in Step S704), the document management server program 7042 generates list display data of contract types registered in the field 70431 of each record 70430 of the template database 6043, and transmits the data to the local machine 1 (Step S705). Then, upon receipt of designation of a contract type from the local machine 1, the record 70430 having this contract type registered in the field 70431 is retrieved from the template database 7043, and template data registered in the field 70432 of the retrieved record 70430 is transmitted to the local machine 1 (Step S706). Then, upon receipt of a registration request for newly created contract data from this template data from the local machine 1 (Step S707), the document management server program 7042 generates a unique document ID (e.g., serial number) (Step S708). A new record 70440 is added to the contract database 7044. The generated document ID is registered in the field 70441 of the record 70440, the contract data received from the local machine 1 is registered in the field 70442, the document management server authentication information (e.g., a user ID) received from the local machine 1 is registered in the field 70443, and null data indicating that signing is yet to be made is registered in the field ID 70444 (Step S709). Then, the document management server program 7042 transmits the generated document ID to the local machine 1 (Step S710).

Upon reception of a contract request containing document ID from the local machine 1 in which user authentication has succeeded (YES in Step S711), the document management server program 7042 retrieves the record 70440 having the document ID registered in the field 70441 from the contract database 7044, and transmits contract data registered in the field 70442 of the retrieved record 70440 to the local machine 1 (Step S712). Subsequently, upon reception of a registration request of contract data created by editing the contract data from the local machine 1 (Step S713), the document management server program 7042 updates the contract data registered in the field 70442 of the record 70440 retrieved in Step S712 to contract data of a registration request target (Step S714).

Upon reception of a contract request containing document ID from the signature server 8 via the OS 7041 and the NIC 703 (YES in Step S720), the document management server program 7042 retrieves the record 70440 having the document ID registered in the field 70441 from the contract database 7044, and transmits the contract data registered in the field 70442 of the retrieved record 70440 to the signature server 8 (Step S721). Subsequently, upon reception of a registration request of a signature ID of signature data with respect to the contract data (Step S722) from the signature server 8, the document management server program 7042 registers a signature ID of a registration request target in the field 70444 of the record 70440 retrieved in Step S722 (Step S723).

The description will be continued referring back to FIG. 1.

The signature server 8 generates a signature for contract data and a key used for the signature.

Figure 15:
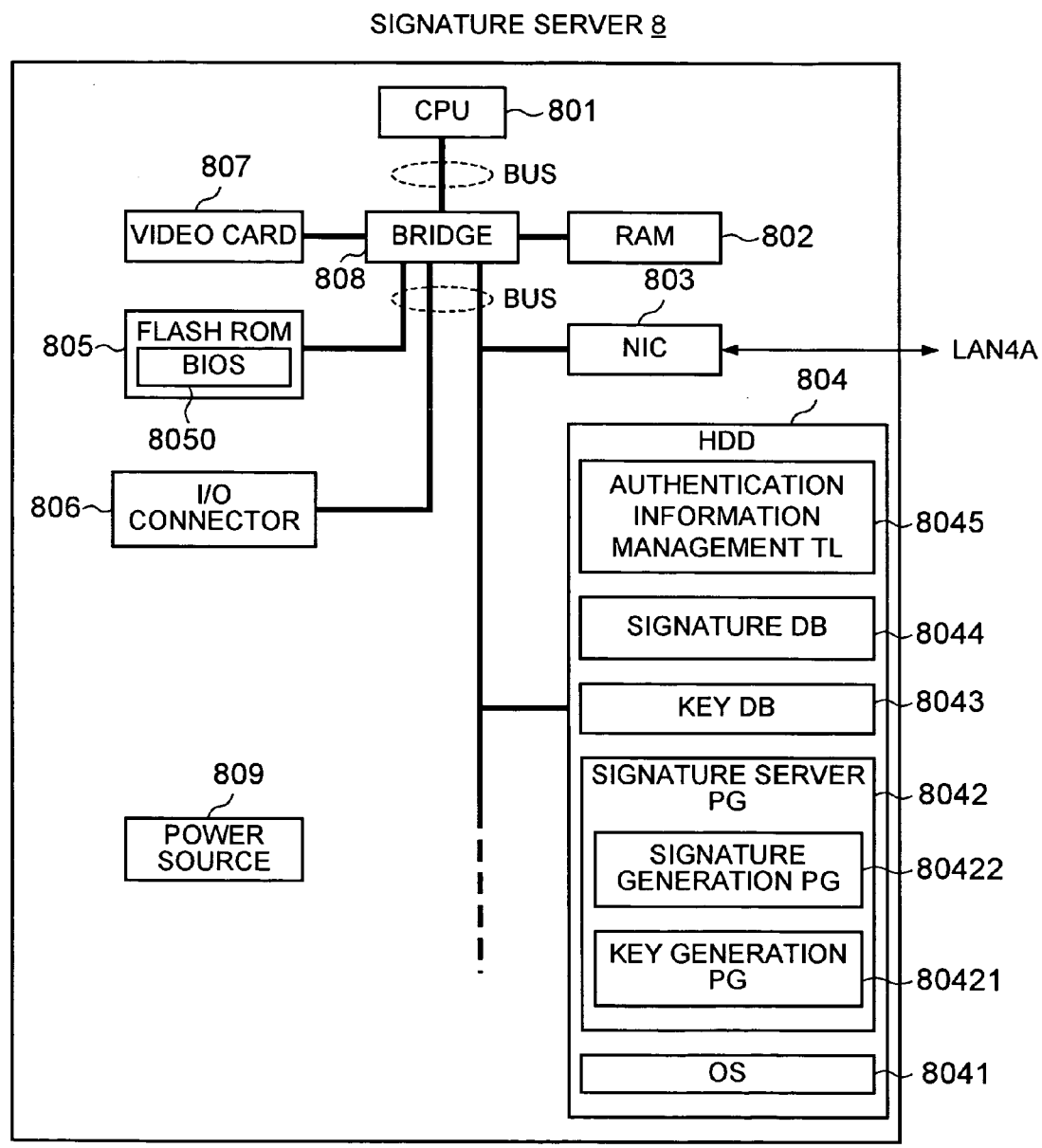
FIG. 15 is a diagram showing a rough configuration example of a signature server.

FIG. 15 is a schematic diagram of the signature server 8. As shown in the figure, the signature server 8 includes a CPU 801, a RAM 802 which functions as a work area of the CPU 801, a NIC 803 for connection to a LAN 4A, an HDD 804, a flash ROM 805, an I/O connector 806 which is used for connecting a keyboard and a mouse, a video card 807 which is used for connecting a display, a bridge 808 which relays a bus, BUS, to connect the units 801 to 807, and a power source 809.

The flash ROM 805 stores a BIOS 8050. The CPU 801 first accesses the flash ROM 805 to execute the BIOS 8050 after the power source 809 is turned on, thereby recognizing a system configuration of the signature server 8.

The HDD 804 at least stores an OS 8041, a signature server program 8042, a key database 8043, a signature database 8044, and an authentication information management table 8045.

The OS 8041 is a program which causes the CPU 801 to integrally control the units 802 to 809 of the signature server 8, and to execute the signature server program 8042. The CPU 801 loads the OS 8041 from the HDD 804 to the RAM 802 to execute the OS 8041 according to the BIOS 8050. Accordingly, the CPU 801 controls the units 802 to 809 of the signature server 8.

The signature server program 8042 is a program which provides key and signature generation services to the local machine 1, and includes a key generation program 80421 and a signature generation program 80422. The key generation program 80421 generates a pair of signature and verification keys (i.e., secret and verification keys). The signature generation key 80422 generates signature data (i.e., electronic signature) for contract data using the signature key.

In the key database 8043, key data of each insured person as a client of the user of the remote machine 2 is registered. FIG. 16 schematically shows registered contents of the key database. As shown in the figure, a record 80430 is registered for each insured person. The record 80430 includes a field 80431 which registers biological information (e.g., finger vein information, which is binary data) of the insured person, a field 80432 which registers identification information (i.e., a signature key ID) of the signature key, a field 80433 which registers the signature key, a field 80434 which registers identification information (i.e., a verification key ID) of the verification key, and a field 80435 which registers the verification key.

In the signature database 8044, signature data for contract data is registered. FIG. 17 schematically shows registered contents of the signature database 8044. As shown in the figure, a record 80440 is registered for each signature data. The record 80440 includes a field 80441 which registers a signature ID, a field 80442 which registers signature data, which is binary data, a field 80443 which registers a signature key ID of the signature key used for generating the signature data, and a field 80444 which registers a verification key ID of the verification key used for verifying the signature data.

In the authentication information management table 8045, signature server authentication information (i.e., a user ID and password) of each user of the remote machine 2 which can use signature services (i.e., key and signature generation services) is registered.

FIG. 18 shows an operation of the signature server 8. This process flow is normally executed by the CPU 801 according to the program. However, to simplify explanation, the flow will be described by setting the program as a principal executor.

Upon reception of a signature service request from the local machine 1 via the OS 8041 and the NIC 803 (YES in Step S801), the signature server program 8042 transmits a signature service response to the local machine 1, and waits for arrival of the signature server authentication information from the local machine 1. Then, by investigating whether the signature server authentication information received from the local machine 1 has been registered in the authentication information management table 8045, user authentication is performed (Step S802).

If the user authentication fails (NO in Step S803), the signature server program 8042 executes predetermined error notification such as transmission of an authentication result indicating the authentication failure to the local machine 1 (Step S813) to finish the flow. On the other hand, if the user authentication succeeds (YES in Step S803), the signature server program 8042 transmits an authentication result indicating the authentication success to the local machine 1, and waits for a request from the local machine 1.

Upon reception of a key generation request from the local machine 1 in which the user authentication has succeeded (YES in Step S804), the signature server program 8042 starts the key generation program 80421. The key generation program 80421 generates a pair of signature and verification keys (Step S805). The signature server program 8042 generates a signature key ID and a verification key ID as unique identification information of the signature and verification keys generated by the key generation program 80421. A new record 80430 is generated in the key database 8043. Then, the biological information contained in the key generation request is registered in the field 80431 of the record 80430, the signature key ID is registered in the field 80432, the signature key is registered in the field 80433, the verification key ID is registered in the field 80434, and the verification key is registered in the field 80435 (Step S806).

Upon reception of a signature generation request from the local machine 1 in which user authentication has succeeded (YES in Step S807), the signature server program 8042 starts the signature generation program 80422. The signature generation program 80422 generates a contract request containing document ID contained in the signature generation request, and transmits this document ID to the document management server 7 to obtain contract data of a signature target from the document management server 7 (Step S808). The signature generation program 80422 retrieves the record 80430 having the biological information contained in the signature generation request registered in the field 80431 from the key database 8043, and reads the signature key registered in the field 80433 of the record 80430 (Step S809).

Then, by using the read signature key, signature data (i.e., an electronic signature name) is generated for the contract data obtained from the document management server 7 (Step S810). The signature server program 8042 generates a signature ID as identification information unique to the signature data generated by the signature generation program 80422. A new record 80440 is generated in the signature database 8044. Then, the signature key and the verification key ID are respectively registered in the fields 80441 and 80442 of the record 80440. Then, the signature key ID and the verification key ID registered in the fields 80432 and 80434 of the record 80430 retrieved in Step S809 are respectively registered in the fields 80443 and 80444 (Step S811). The signature server program 8042 transmits the signature ID to the local machine 1 (Step S812).

In this case, the signature server program 8042 may write the contract data, the signature data, and the verification key in, e.g., a storage medium such as an IC card (not shown) connected to the signature server 8. Then, this storage medium may be sent to the insured person by moving means such as mailing.

Next, a rough operation of the electronic contract system of the above configuration will be described.

FIG. 19 shows a rough operation example when contract data is created at the electronic contract system of the embodiment of the present invention.

The remote machine 2 receives remote machine authentication information from a user, and transmits the information to the authentication device 6. The authentication device 6 executes user authentication by using the remote machine authentication information received from the remote machine 2 and remote machine authentication information preregistered in the authentication device 6 (Step S11). If the user authentication succeeds, an address of the local machine 1 preregistered in the authentication device 6 is transmitted to the remove machine 2 (Step S12).

Upon reception of the address, the remote machine 2 transmits a terminal service request to the local machine 1 specified by the address notified from the authentication device 6 (Step S13). The local machine authentication information preregistered in the authentication device 6 is transmitted to the local machine 1. The local machine 1 executes user authentication by using the local machine authentication information received from the remote machine 2 and the local machine authentication information preregistered in the local machine 1 (Step S14). If the user authentication succeeds, a VPN connection is established with the remote machine 2 (Step S15), and provision of terminal services to the remote machine 2 via the VPN is started (Step S16).

Next, when instructed to start the document management client program 1044 from the user of the remote machine 2, the local machine 1 transmits a document management service request to the document management server 7 by a desktop operation using the terminal services (Step S17). The document management server authentication information preregistered in the local machine 1 is transmitted to the document management server 7. The document management server 7 executes user authentication by using the document management server authentication information received from the local machine 1 and the document management server authentication information preregistered in the document management server 7 (Step S18). If the user authentication succeeds, provision of document management services to the local machine 1 is started.

The local machine 1 creates contract data by a desktop operation of the user of the remote machine 2 using the terminal services to read and edit template data or contract data from the document management server 7 (Step S19). Then, a document ID is added to the created contract data, and the contract data is registered in the document management server 7 (Step S20).

FIG. 20 shows a rough operation example when key data is created in the electronic contract system of the embodiment of the present invention.

Operations of Steps S31 to S36 before the local machine 1 starts terminal services to the remote machine 2 are similar to Steps S11 to S16 of FIG. 19. Subsequently, when instructed to start the signature client program 1045 from the user of the remote machine 2, the local machine 1 transmits a signature service request to the signature server 8 by a desktop operation using the terminal services (Step S37). Signature server authentication information preregistered in the local machine 1 is transmitted to the signature server 8. The signature server 8 executes user authentication by using the signature server authentication information received from the local machine 1 and the signature server authentication information preregistered in the signature server 8 (Step S38). Then, if the user authentication succeeds, provision of signature services to the local machine 1 is started.

By the desktop operation of the user of the remote machine 2 using the terminal services, the local machine 1 obtains biological information of an insured person as a client of the user of the remote machine 2 via the biological information reader 207 connected to the remote machine 2. Then, a key generation request containing the obtained biological information is generated, and transmitted to the signature server 8 (Step S39). Upon receipt of this request, the signature server 8 generates a pair of signature and verification keys. The generated signature and verification keys are correlated with the biological information of the insured person contained in the key generation request to be registered (Step S40).

FIG. 21 shows a rough operation example when signature data is created in the electronic contract system of the embodiment of the present invention.

Operations of Steps S51 to S56 before the local machine 1 starts terminal services to the remote machine 2 are similar to Steps S11 to S16 of FIG. 19. Operations of Steps S57 and S58 before the signature server 8 starts signature services to the local machine 1 are similar to Steps S37 and S38 of FIG. 20.

By the desktop operation of the user of the remote machine 2 using the terminal services, the local machine 1 obtains a document ID from the user of the remote machine 2, and the biological information of the insured person as a client of the user of the remote machine 2 via the biological information reader 207 connected to the remote machine 2. A signature generation request containing the obtained document ID and biological information is generated, and transmitted to the signature server 8 (Step S59). Upon receipt of this request, the signature server 8 obtains contract data corresponding to the document ID contained in the signature generation request from the document management server 7, and signature data is generated for the contract data by using a signature key correlated with the biological information contained in the signature generation request to be registered. Then, a signature ID is correlated with the signature data to be registered, and the signature ID is transmitted to the local machine 1 (Step S60).

Before signing, the document management services Steps S17 to S20 of FIG. 19 may be executed to enable checking of the contents of the contract data by the user of the remote machine 2 and the insured person as the client of the user.

An embodiment of the present invention is described.

According to the embodiment, it is possible to generate an electronic signature for document data without fetching any signature key from the remote machine. It is possible to reduce security risk accompanying movement of the signature key.

The invention is not limited to the embodiment. Various changes and modifications can be made within the scope of its gist.

For example, the embodiment has been described taking, as an example, a case where the key and signature generation services are realized by one signature server 8. However, the key and signature generation services may be realized by different information processing apparatuses.

The embodiment has been described by taking the example of the remote desktop system where the local machine 1 provides terminal services to the remote machine 2. However, the present invention is not limited to this example. The invention can similarly be applied to a normal client server system (in which the local machine 1 corresponds to a server while the remote machine 2 corresponds to a client).

The embodiment has been described by taking the example of the electronic contract system which generates signature data of an insured person, or the like, for the contract data. However, the present invention is not limited to this example. The invention can be applied to various systems which generate signature data for the document data.

According to the embodiment, each program may be installed from a portable storage medium such as a CD-ROM or a DVD-ROM to a computer (i.e., local machine 1, remote machine 2, document management server 7, or signature server 8). Alternatively, the program may be downloaded to the computer via a communication medium such as a digital signal, a carrier wave or a network to be installed.

What is claimed is:

1. A signature support system which supports inclusion of a signature in document data, comprising:
a remote machine;
a local machine which provides terminal services to the remote machine;
a document management server which provides document management services to the local machine; and
a signature server which provides key services and signature services to the local machine,
wherein the document management server includes:
document data storing means which stores document data;
document management authenticating means which authenticates the local machine by using document management server authentication information; and
document management control means which correlates the document data with a document ID serving as identification information of the document data, to store the document data in the document data storing means, in accordance with an instruction from the local machine authenticated by the document management authenticating means, transmits the document data correlated with the document ID received from the signature server and stored in the document data storing means, in accordance with an instruction from the signature server, receives a signature ID as identification information of signature data for the document data from the signature server, and correlates the signature ID with the document data, to store the signature ID in the document data storing means;
the signature server includes:
signature data storing means which stores the signature data;
key storing means which stores a signature key and a verification key;

signature authenticating means which authenticates the local machine by using signature server authentication information;

key control means which generates a pair of a signature key and a verification key in accordance with a key generation request received from the local machine authenticated by the signature authenticating means, and correlates the pair of keys with biometric authentication information, obtained at the remote machine, of a person who is involved with a document to be registered in the document management server and who is not a user of the remote machine, included in the key generation request, to store the keys in the key storing means and to make the keys searchable; and signature control means which accesses the document management server to read the document data having the document ID received from the local machine, from the document management server, in accordance with a signature generation request received from the local machine authenticated by the signature authenticating means, obtains by searching, as a key, the biometric information, obtained at the remote machine, of the person who is involved with the document to be registered in the document management server and who is not the user of the remote machine, included in the signature generation request, and stored in the key storing means, generates signature data for the document data by using the signature key, correlates the signature data with a signature ID of the signature data, to store the signature data in the signature data storing means, and notifies the document management server of the signature ID;

the local machine includes:

local authenticating means which authenticates the user of the remote machine by using local machine authentication information;

terminal service providing means which provides the terminal services to the remote machine operated by the user of the remote machine authenticated by the local authenticating means;

document management server access control means which accesses the document management server by using pre-registered document management server authentication information in accordance with an instruction from the remote machine using the terminal services; and signature server access control means which accesses the signature server by using preregistered signature server authentication information in accordance with an instruction from the local machine using the terminal services, the remote machine includes:

local machine authentication information input means which receives input of local machine authentication information of the user of the remote machine;

biometric information reading means which reads the biometric information of the person who is involved with the document to be registered in the document management server and who is different from the user of the remote machine; and local machine access control means which accesses the local machine by using the local machine authentication information received by the local machine authentication information input means, to receive the terminal services of the local machine;

wherein the document management server access control means of the local machine registers the document data together with the document ID of the document data in the document management server in accordance with an instruction received from the remote machine via the terminal services; and wherein further the signature server access control means of the local machine generates a key generation request that includes the biometric information of the person who is involved with the document to be registered in the document management server and who is different from the user of the remote machine in accordance with an instruction, including the biometric information obtained at the remote machine, received from the remote machine via the terminal services, transmits the key generation request thus generated to the signature server, generates the signature generation request that includes biometric information of the person who is involved with the document to be registered in the document management server and who is different from the user of the remote machine, in accordance with an instruction including the biometric information obtained at the remote machine, received from the remote machine via the terminal services, transmits the signature generation request thus generated to the signature server, and receives the signature ID of the signature data generated by the signature server from the signature server.

2. A signature support system according to claim 1, wherein the biometric information comprises finger vein information.

3. A signature support system according to claim 1, wherein the local machine authentication information input means further reads the local machine authentication information from a predetermined storage medium.

4. A signature support system according to claim 2, wherein the local machine authentication information input means further reads the local machine authentication information from a predetermined storage medium.

5. A method which supports inclusion of a signature in document data by a signature support system including a remote machine, a local machine which provides terminal services to the remote machine, a document management server which provides document management services to the local machine, and a signature server which provides key services and signature services to the local machine, the method comprising:

a document management step in which the remote machine receives the document management services provided by the document management server, by using the terminal services of the local machine;

a key generation step in which the remote machine receives the key services provided by the signature server by using the terminal services of the local machine; and a signature generation step in which the remote machine receives the signature services provided by the signature server, by using the terminal services of the local machine, wherein the document management step includes:

a step in which the remote machine accesses the local machine by using local machine authentication information input from the outside and, in response, the local machine starts providing the terminal services to the remote machine;

a step in which the local machine accesses the document management server by using preregistered document management server authentication information and, in response, the document management server starts providing the document management services to the local machine; and a step in which the remote machine correlates the document data with a document ID serving as identification information of the document data to register the document data in the document management server by using the document management services of the document management server via the terminal services of the local machine;

the key generation step includes:

a step in which the remote machine accesses the local machine by using the local machine authentication information input from the outside and, in response, the local machine starts providing the terminal services to the remote machine;

a step in which the local machine accesses the signature server by using preregistered signature server authentication information and, in response, the signature server starts providing the key services to the local machine; and a step in which the remote machine uses the key services of the signature server via the terminal services of the local machine, causing the signature server to generate a pair of a signature key and a verification key, and correlating the pair of keys with biometric information associated with a person who is not a user of the terminal read from a biometric information reader, to register the pair of the signature key and the verification key in the signature server; and the signature generation step includes:

a step in which the remote machine accesses the local machine by using the local machine authentication information input from the outside and, in response, the local machine starts providing the terminal services to the remote machine;

a step in which the local machine accesses the signature server by using the preregistered signature server authentication information and, in response, the signature server starts providing the signature services to the local machine; and a step in which the remote machine uses the signature services of the signature server via the terminal services of the local machine causing the signature server to generate signature data for the document data correlated with a document ID received from a user and registered in the document management server, by using the signature key correlated with the biometric information read from the biometric information reader, and registered in the signature server.

* * * * *